(12) United States Patent
Johnson et al.

(10) Patent No.: US 10,194,293 B2
(45) Date of Patent: Jan. 29, 2019

(54) SYSTEM AND METHOD FOR VITAL SIGNS ALERTING PRIVILEGED RECIPIENTS

(71) Applicants: William J. Johnson, Flower Mound, TX (US); Michael J. Johnson, Flower Mound, TX (US)

(72) Inventors: William J. Johnson, Flower Mound, TX (US); Michael J. Johnson, Flower Mound, TX (US)

( * ) Notice: Subject to any disclaimer, the term of this patent is extended or adjusted under 35 U.S.C. 154(b) by 0 days.

(21) Appl. No.: 15/863,864

(22) Filed: Jan. 6, 2018

(65) Prior Publication Data
US 2018/0132080 A1 May 10, 2018

Related U.S. Application Data

(63) Continuation of application No. 14/041,292, filed on Sep. 30, 2013, now Pat. No. 9,894,489.

(51) Int. Cl.
*H04W 4/38* (2018.01)
*H04W 4/04* (2009.01)
(Continued)

(52) U.S. Cl.
CPC ............ *H04W 4/38* (2018.02); *H04W 4/043* (2013.01); *H04W 4/30* (2018.02); *H04W 4/023* (2013.01); *H04W 4/026* (2013.01)

(58) Field of Classification Search
CPC ..... H04W 4/043; H04W 4/026; H04W 4/023; H04W 4/04; H04W 68/00; H04W 68/04;
(Continued)

(56) References Cited

U.S. PATENT DOCUMENTS

| 3,636,421 A | 3/1972 | Barker et al. |
| 4,021,780 A | 5/1977 | Narey et al. |

(Continued)

FOREIGN PATENT DOCUMENTS

| EP | 0712227 | 5/1996 |
| EP | 915590 | 5/1999 |

(Continued)

OTHER PUBLICATIONS

Bill N_ Schilit and Marvin M_ Theimer, Disseminating Active Map Information Mobile Hosts, IEEE Network, Sep./Oct. 1994.
(Continued)

*Primary Examiner* — Meless Zewdu
(74) *Attorney, Agent, or Firm* — Yudell Isidore, PLLC

(57) ABSTRACT

Provided is a system and method for a situational proximity observation by a Mobile data processing System (MS) using one or more automated senses of the MS, for example as directed by a user of the MS, to cause an alert to be delivered to one or more other Mobile data processing Systems (MSs) for notifying those other users of the MSs that they are potentially involved in, or affected by, the sensing carried out by the MS making the observation. Specifically, a Situational Proximity Observation Device Reporter (SPODR) captures vital signs associated with a user and a TRaveling Observation Device Recipient (TRODR) can be notified when captured data is relevant to the TRODR. There is a variety of events and conditions under which the alert is provided, including in accordance with a variety of privileges configured between users.

20 Claims, 13 Drawing Sheets

(51) Int. Cl.
*H04W 4/30* (2018.01)
*H04W 4/02* (2018.01)

(58) Field of Classification Search
CPC ......... H04W 4/90; H04W 76/50; H04W 4/14;
H04W 88/02; H04W 88/184; H04W
88/021; H04W 88/18; H04W 92/18;
H04W 92/08; H04W 4/38; H04W 4/30;
H04W 76/00; H04W 4/02; H04W 4/20;
H04W 12/00; H04W 12/02; H04W 4/50;
H04W 4/60; H04W 4/029
See application file for complete search history.

(56) References Cited

U.S. PATENT DOCUMENTS

| | | |
|---|---|---|
| 4,255,619 A | 3/1981 | Saito |
| 4,445,118 A | 4/1984 | Taylor et al. |
| 4,536,647 A | 8/1985 | Atalla et al. |
| 4,644,351 A | 2/1987 | Zabarsky et al. |
| 4,757,267 A | 7/1988 | Riskin |
| 4,841,560 A | 6/1989 | Chan et al. |
| 4,845,504 A | 7/1989 | Roberts et al. |
| 4,922,516 A | 5/1990 | Butler et al. |
| 4,973,952 A | 11/1990 | Malec et al. |
| 4,974,170 A | 11/1990 | Bouve et al. |
| 4,977,399 A | 12/1990 | Price et al. |
| 5,089,814 A | 2/1992 | Deluca et al. |
| 5,095,532 A | 3/1992 | Mardus |
| 5,121,126 A | 6/1992 | Clagett |
| 5,122,795 A | 6/1992 | Cubley et al. |
| 5,131,020 A | 7/1992 | Liebesny et al. |
| 5,185,857 A | 2/1993 | Rozmanith et al. |
| 5,196,031 A | 3/1993 | Ordish |
| 5,214,793 A | 5/1993 | Conway et al. |
| 5,223,844 A | 6/1993 | Mansell et al. |
| 5,243,652 A | 9/1993 | Teare et al. |
| 5,245,608 A | 9/1993 | Deaton et al. |
| 5,264,822 A | 11/1993 | Vogelman et al. |
| 5,265,070 A | 11/1993 | Minowa |
| 5,303,393 A | 4/1994 | Noreen et al. |
| 5,321,242 A | 6/1994 | Heath, Jr. |
| 5,337,044 A | 8/1994 | Folger et al. |
| 5,347,632 A | 9/1994 | Filepp et al. |
| 5,363,245 A | 11/1994 | Borello |
| 5,363,377 A | 11/1994 | Sharpe |
| 5,365,516 A | 11/1994 | Jandrell |
| 5,371,794 A | 12/1994 | Diffie et al. |
| 5,390,237 A | 2/1995 | Hoffman et al. |
| 5,404,505 A | 4/1995 | Levinson |
| 5,432,841 A | 7/1995 | Rimer |
| 5,444,444 A | 8/1995 | Ross |
| 5,451,757 A | 9/1995 | Heath, Jr. |
| 5,455,807 A | 10/1995 | Nepple |
| 5,461,627 A | 10/1995 | Rypinski |
| 5,469,362 A | 11/1995 | Hunt et al. |
| 5,475,735 A | 12/1995 | Williams et al. |
| 5,485,163 A | 1/1996 | Singer et al. |
| 5,487,103 A | 1/1996 | Richardson |
| 5,493,309 A | 2/1996 | Bjornholt et al. |
| 5,497,414 A | 3/1996 | Bartholomew |
| 5,504,482 A | 4/1996 | Schreder |
| 5,511,111 A | 4/1996 | Serbetcioglu et al. |
| 5,511,233 A | 4/1996 | Otten |
| 5,512,908 A | 4/1996 | Herrick |
| 5,513,263 A | 4/1996 | White et al. |
| 5,528,248 A | 6/1996 | Steiner et al. |
| 5,539,395 A | 7/1996 | Buss et al. |
| 5,544,354 A | 8/1996 | May et al. |
| 5,559,520 A | 9/1996 | Barzegar et al. |
| 5,561,704 A | 10/1996 | Samilando |
| 5,566,235 A | 10/1996 | Hetz |
| 5,581,479 A | 12/1996 | McLaughlin |
| 5,583,864 A | 12/1996 | Lightfoot et al. |
| 5,586,254 A | 12/1996 | Kondo et al. |
| 5,588,042 A | 12/1996 | Comer |
| 5,590,196 A | 12/1996 | Moreau |
| 5,590,398 A | 12/1996 | Matthews |
| 5,592,470 A | 1/1997 | Rudrapatna et al. |
| 5,594,779 A | 1/1997 | Goodman |
| 5,596,625 A | 1/1997 | LeBlanc |
| 5,602,843 A | 2/1997 | Gray |
| 5,608,854 A | 3/1997 | Labedz et al. |
| 5,610,973 A | 3/1997 | Comer |
| 5,625,364 A | 4/1997 | Herrick et al. |
| 5,625,668 A | 4/1997 | Loomis |
| 5,627,549 A | 5/1997 | Park |
| 5,636,245 A | 6/1997 | Ernst et al. |
| 5,646,632 A | 7/1997 | Khan et al. |
| 5,654,959 A | 8/1997 | Baker et al. |
| 5,657,375 A | 8/1997 | Connolly et al. |
| 5,661,492 A | 8/1997 | Shoap et al. |
| 5,663,734 A | 9/1997 | Krasner |
| 5,664,948 A | 9/1997 | Dimitriadis et al. |
| 5,666,481 A | 9/1997 | Lewis |
| 5,677,905 A | 10/1997 | Bigham |
| 5,687,212 A | 11/1997 | Kinser, Jr. et al. |
| 5,689,431 A | 11/1997 | Rudow et al. |
| 5,694,453 A | 12/1997 | Fuller et al. |
| 5,701,301 A | 12/1997 | Weisser, Jr. |
| 5,704,049 A | 12/1997 | Briechle |
| 5,712,899 A | 1/1998 | Pace, II |
| 5,713,075 A | 1/1998 | Threadgill et al. |
| 5,714,948 A | 2/1998 | Farmakis et al. |
| 5,717,688 A | 2/1998 | Belanger et al. |
| 5,720,033 A | 2/1998 | Deo |
| 5,724,521 A | 3/1998 | Dedrick |
| 5,727,057 A | 3/1998 | Emery et al. |
| 5,729,680 A | 3/1998 | Belanger et al. |
| 5,771,283 A | 6/1998 | Chang et al. |
| 5,774,534 A | 6/1998 | Mayer |
| 5,778,304 A | 7/1998 | Grube et al. |
| 5,790,974 A | 8/1998 | Tognazzini |
| 5,794,210 A | 8/1998 | Goldhaber et al. |
| 5,796,727 A | 8/1998 | Harrison et al. |
| 5,798,733 A | 8/1998 | Ethridge |
| 5,806,018 A | 9/1998 | Smith et al. |
| 5,812,763 A | 9/1998 | Teng |
| 5,819,155 A | 10/1998 | Worthey et al. |
| 5,826,195 A | 10/1998 | Westerlage et al. |
| 5,758,049 A | 11/1998 | Johnson et al. |
| 5,835,061 A | 11/1998 | Stewart |
| 5,838,774 A | 11/1998 | Weisser, Jr. |
| 5,842,010 A | 11/1998 | Jain et al. |
| 5,845,211 A | 12/1998 | Roach |
| 5,852,775 A | 12/1998 | Hidary |
| 5,855,007 A | 12/1998 | Jovicic et al. |
| 5,870,555 A | 2/1999 | Pruett et al. |
| 5,870,724 A | 2/1999 | Lawlor et al. |
| 5,875,186 A | 2/1999 | Belanger et al. |
| 5,875,401 A | 2/1999 | Rochkind |
| 5,878,126 A | 3/1999 | Velamuri et al. |
| 5,880,958 A | 3/1999 | Helms et al. |
| 5,881,131 A | 3/1999 | Farris et al. |
| 5,884,284 A | 3/1999 | Peters et al. |
| 5,887,259 A | 3/1999 | Zicker et al. |
| 5,889,953 A | 3/1999 | Thebaut et al. |
| 5,892,454 A | 4/1999 | Schipper et al. |
| 5,896,440 A | 4/1999 | Reed et al. |
| 5,897,640 A | 4/1999 | Veghte et al. |
| 5,903,636 A | 5/1999 | Malik |
| 5,907,544 A | 5/1999 | Rypinski |
| 5,920,846 A | 7/1999 | Storch et al. |
| 5,922,040 A | 7/1999 | Prabhakaran |
| 5,923,702 A | 7/1999 | Brenner et al. |
| 5,933,420 A | 8/1999 | Jaszewski et al. |
| 5,938,721 A | 8/1999 | Dussell et al. |
| 5,949,867 A | 9/1999 | Sonnenberg |
| 5,950,130 A | 9/1999 | Coursey |
| 5,961,593 A | 10/1999 | Gabber et al. |
| 5,963,866 A | 10/1999 | Palamara et al. |
| 5,963,913 A | 10/1999 | Henneuse et al. |
| 5,968,176 A | 10/1999 | Nessett et al. |
| 5,969,678 A | 10/1999 | Stewart |

(56) References Cited

U.S. PATENT DOCUMENTS

| | | |
|---|---|---|
| 5,982,867 A | 11/1999 | Urban et al. |
| 5,983,091 A | 11/1999 | Rodriguez |
| 5,987,381 A | 11/1999 | Oshizawa |
| 5,991,287 A | 11/1999 | Diepstraten et al. |
| 5,995,015 A | 11/1999 | DeTemple et al. |
| 6,006,090 A | 12/1999 | Coleman et al. |
| 6,009,398 A | 12/1999 | Mueller et al. |
| 6,011,975 A | 1/2000 | Emery et al. |
| 6,018,293 A | 1/2000 | Smith et al. |
| 6,026,151 A | 2/2000 | Bauer et al. |
| 6,028,921 A | 2/2000 | Malik et al. |
| 6,047,327 A | 4/2000 | Tso et al. |
| 6,055,637 A | 4/2000 | Hudson et al. |
| 6,058,106 A | 5/2000 | Cudak et al. |
| 6,067,082 A | 5/2000 | Enmei |
| 6,067,297 A | 5/2000 | Beach |
| 6,073,062 A | 6/2000 | Hoshino et al. |
| 6,076,080 A | 6/2000 | Morscheck et al. |
| 6,085,086 A | 7/2000 | La Porta et al. |
| 6,091,956 A | 7/2000 | Hollenberg |
| 6,101,381 A | 8/2000 | Tajima et al. |
| 6,101,443 A | 8/2000 | Kato et al. |
| 6,112,186 A | 8/2000 | Bergh et al. |
| 6,115,669 A | 9/2000 | Watanabe et al. |
| 6,122,520 A | 9/2000 | Want et al. |
| 6,133,853 A | 10/2000 | Obradovich et al. |
| 6,138,003 A | 10/2000 | Kingdon et al. |
| 6,138,119 A | 10/2000 | Hall et al. |
| 6,141,609 A | 10/2000 | Herdeg et al. |
| 6,144,645 A | 11/2000 | Struhsaker et al. |
| 6,154,152 A | 11/2000 | Ito |
| 6,154,637 A | 11/2000 | Wright et al. |
| 6,157,829 A | 12/2000 | Grube et al. |
| 6,157,946 A | 12/2000 | Itakura et al. |
| 6,163,274 A | 12/2000 | Lindgren |
| 6,167,255 A | 12/2000 | Kennedy, III et al. |
| 6,182,226 B1 | 1/2001 | Reid et al. |
| 6,184,829 B1 | 2/2001 | Stilp |
| 6,185,426 B1 | 2/2001 | Alperovich et al. |
| 6,185,484 B1 | 2/2001 | Rhinehart |
| 6,192,314 B1 | 2/2001 | Khavakh et al. |
| 6,202,054 B1 | 3/2001 | Lawlor et al. |
| 6,205,478 B1 | 3/2001 | Sugano et al. |
| 6,208,854 B1 | 3/2001 | Roberts et al. |
| 6,208,866 B1 | 3/2001 | Rouhollahzadeh et al. |
| 6,226,277 B1 | 5/2001 | Chuah |
| 6,229,477 B1 | 5/2001 | Chang et al. |
| 6,229,810 B1 | 5/2001 | Gerszberg et al. |
| 6,233,329 B1 | 5/2001 | Urban et al. |
| 6,233,452 B1 | 5/2001 | Nishina |
| 6,236,360 B1 | 5/2001 | Rudow et al. |
| 6,236,362 B1 | 5/2001 | Leblanc et al. |
| 6,236,940 B1 | 5/2001 | Rudow et al. |
| 6,246,361 B1 | 6/2001 | Weill et al. |
| 6,246,948 B1 | 6/2001 | Thakker |
| 6,252,544 B1 | 6/2001 | Hoffberg |
| 6,259,405 B1 | 7/2001 | Stewart et al. |
| 6,263,209 B1 | 7/2001 | Reed et al. |
| 6,278,938 B1 | 8/2001 | Alumbaugh |
| 6,285,665 B1 | 9/2001 | Chuah et al. |
| 6,285,931 B1 | 9/2001 | Hattori et al. |
| 6,298,234 B1 | 10/2001 | Brunner |
| 6,308,273 B1 | 10/2001 | Goertzel et al. |
| 6,311,069 B1 | 10/2001 | Havinis et al. |
| 6,317,718 B1 | 11/2001 | Fano |
| 6,321,092 B1 | 11/2001 | Fitch et al. |
| 6,324,396 B1 | 11/2001 | Vasa et al. |
| 6,326,918 B1 | 12/2001 | Stewart |
| 6,327,254 B1 | 12/2001 | Chuah |
| 6,327,357 B1 | 12/2001 | Meek et al. |
| 6,332,127 B1 | 12/2001 | Bandera et al. |
| 6,332,163 B1 | 12/2001 | Bowman-Amuah |
| 6,340,958 B1 | 1/2002 | Cantu et al. |
| 6,343,290 B1 | 1/2002 | Cossins et al. |
| 6,345,288 B1 | 2/2002 | Reed et al. |
| 6,353,664 B1 | 3/2002 | Cannon et al. |
| 6,359,880 B1 | 3/2002 | Curry et al. |
| 6,360,101 B1 | 3/2002 | Irvin |
| 6,366,561 B1 | 4/2002 | Bender |
| 6,370,389 B1 | 4/2002 | Isomursu et al. |
| 6,377,548 B1 | 4/2002 | Chuah et al. |
| 6,377,810 B1 | 4/2002 | Geiger et al. |
| 6,377,982 B1 | 4/2002 | Rai et al. |
| 6,381,311 B2 | 4/2002 | Joyce et al. |
| 6,385,531 B2 | 5/2002 | Bates et al. |
| 6,385,591 B1 | 5/2002 | Mankoff |
| 6,389,055 B1 | 5/2002 | August et al. |
| 6,389,426 B1 | 5/2002 | Turnbull et al. |
| 6,393,482 B1 | 5/2002 | Rai et al. |
| 6,400,722 B1 | 6/2002 | Chuah et al. |
| 6,405,123 B1 | 6/2002 | Rennard et al. |
| 6,407,673 B1 | 6/2002 | Lane |
| 6,408,307 B1 | 6/2002 | Semple et al. |
| 6,414,635 B1 | 7/2002 | Stewart et al. |
| 6,414,950 B1 | 7/2002 | Rai et al. |
| 6,415,019 B1 | 7/2002 | Savaglio et al. |
| 6,418,308 B1 | 7/2002 | Heinonen et al. |
| 6,421,441 B1 | 7/2002 | Dzuban |
| 6,421,714 B1 | 7/2002 | Rai et al. |
| 6,427,073 B1 | 7/2002 | Kortelsalmi et al. |
| 6,427,115 B1 | 7/2002 | Sekiyama |
| 6,427,119 B1 | 7/2002 | Stefan et al. |
| 6,430,276 B1 | 8/2002 | Bouvier et al. |
| 6,430,562 B1 | 8/2002 | Kardos et al. |
| 6,442,391 B1 | 8/2002 | Johansson et al. |
| 6,442,479 B1 | 8/2002 | Barton |
| 6,442,687 B1 | 8/2002 | Savage |
| 6,449,272 B1 | 9/2002 | Chuah et al. |
| 6,449,497 B1 | 9/2002 | Kirbas et al. |
| 6,452,498 B2 | 9/2002 | Stewart |
| 6,456,234 B1 | 9/2002 | Johnson |
| 6,463,533 B1 | 10/2002 | Calamera et al. |
| 6,470,378 B1 | 10/2002 | Tracton et al. |
| 6,470,447 B1 | 10/2002 | Lambert et al. |
| 6,473,626 B1 | 10/2002 | Nevoux et al. |
| 6,477,382 B1 | 11/2002 | Mansfield et al. |
| 6,477,526 B2 | 11/2002 | Hayashi et al. |
| 6,484,029 B2 | 11/2002 | Hughes et al. |
| 6,484,092 B2 | 11/2002 | Seibel |
| 6,484,148 B1 | 11/2002 | Boyd |
| 6,490,291 B1 | 12/2002 | Lee et al. |
| 6,496,491 B2 | 12/2002 | Chuah et al. |
| 6,496,931 B1 | 12/2002 | Rajchel et al. |
| 6,505,046 B1 | 1/2003 | Baker |
| 6,505,048 B1 | 1/2003 | Moles et al. |
| 6,505,049 B1 | 1/2003 | Dorenbosch |
| 6,505,120 B2 | 1/2003 | Yamashita et al. |
| 6,505,163 B1 | 1/2003 | Zhang et al. |
| 6,512,754 B2 | 1/2003 | Feder et al. |
| 6,516,055 B1 | 2/2003 | Bedeski et al. |
| 6,516,416 B2 | 2/2003 | Gregg et al. |
| 6,519,252 B2 | 2/2003 | Sallberg |
| 6,519,458 B2 | 2/2003 | Oh et al. |
| 6,522,876 B1 | 2/2003 | Weiland et al. |
| 6,526,275 B1 | 2/2003 | Calvert |
| 6,526,349 B2 | 2/2003 | Bullock et al. |
| 6,532,418 B2 | 3/2003 | Chun et al. |
| 6,545,596 B1 | 4/2003 | Moon |
| 6,546,257 B1 | 4/2003 | Stewart |
| 6,560,442 B1 | 5/2003 | Yost et al. |
| 6,560,461 B1 | 5/2003 | Fomukong et al. |
| 6,571,279 B1 | 5/2003 | Herz et al. |
| 6,577,643 B1 | 6/2003 | Rai et al. |
| 6,577,644 B1 | 6/2003 | Chuah et al. |
| 6,594,482 B1 | 7/2003 | Findikli et al. |
| 6,615,131 B1 | 9/2003 | Rennard et al. |
| 6,618,474 B1 | 9/2003 | Reese |
| 6,618,593 B1 | 9/2003 | Drutman et al. |
| 6,622,016 B1 | 9/2003 | Sladek et al. |
| 6,628,627 B1 | 9/2003 | Zendle et al. |
| 6,628,928 B1 | 9/2003 | Crosby et al. |
| 6,628,938 B1 | 9/2003 | Rachabathuni et al. |
| 6,633,633 B1 | 10/2003 | Bedingfield |
| 6,640,184 B1 | 10/2003 | Rabe |

(56) References Cited

U.S. PATENT DOCUMENTS

| | | |
|---|---|---|
| 6,647,257 B2 | 11/2003 | Owensby |
| 6,647,269 B2 | 11/2003 | Hendrey et al. |
| 6,650,901 B1 | 11/2003 | Schuster et al. |
| 6,654,610 B1 | 11/2003 | Chen et al. |
| 6,662,014 B1 | 12/2003 | Walsh |
| 6,665,536 B1 | 12/2003 | Mahany |
| 6,665,718 B1 | 12/2003 | Chuah et al. |
| 6,671,272 B2 | 12/2003 | Vaziri et al. |
| 6,675,017 B1 | 1/2004 | Zellner et al. |
| 6,675,208 B1 | 1/2004 | Rai et al. |
| 6,677,894 B2 | 1/2004 | Sheynblat et al. |
| 6,697,018 B2 | 2/2004 | Stewart et al. |
| 6,697,783 B1 | 2/2004 | Brinkman et al. |
| 6,701,160 B1 | 3/2004 | Pinder et al. |
| 6,701,251 B2 | 3/2004 | Stefan et al. |
| 6,704,311 B1 | 3/2004 | Chuah et al. |
| 6,716,101 B1 | 4/2004 | Meadows et al. |
| 6,721,406 B1 | 4/2004 | Contractor |
| 6,725,048 B2 | 4/2004 | Mao et al. |
| 6,731,238 B2 | 5/2004 | Johnson |
| 6,732,080 B1 | 5/2004 | Slants |
| 6,732,101 B1 | 5/2004 | Cook |
| 6,732,176 B1 | 5/2004 | Stewart et al. |
| 6,738,808 B1 | 5/2004 | Zellner et al. |
| 6,754,504 B1 | 6/2004 | Reed |
| 6,754,582 B1 | 6/2004 | Smith et al. |
| 6,759,960 B2 | 7/2004 | Stewart et al. |
| 6,772,064 B1 | 8/2004 | Smith et al. |
| 6,799,049 B1 | 9/2004 | Zellner et al. |
| 6,801,509 B1 | 10/2004 | Chuah et al. |
| 6,816,720 B2 | 11/2004 | Hussain et al. |
| 6,819,929 B2 | 11/2004 | Antonucci et al. |
| 6,820,062 B1 | 11/2004 | Gupta et al. |
| 6,829,475 B1 | 12/2004 | Lee et al. |
| 6,850,758 B1 | 2/2005 | Paul et al. |
| 6,867,733 B2 | 3/2005 | Sandhu et al. |
| 6,868,074 B1 | 3/2005 | Hanson |
| 6,874,011 B1 | 3/2005 | Spielman |
| 6,876,858 B1 | 4/2005 | Duvall et al. |
| 6,898,569 B1 | 5/2005 | Bansal et al. |
| 6,937,869 B1 | 8/2005 | Rayburn |
| 6,937,998 B1 | 8/2005 | Swartz et al. |
| 6,954,147 B1 | 10/2005 | Cromer et al. |
| 6,985,747 B2 | 1/2006 | Chithambaram |
| 6,999,572 B1 | 2/2006 | Shaffer et al. |
| 7,005,985 B1 | 2/2006 | Steeves |
| 7,009,556 B2 | 3/2006 | Stewart et al. |
| 7,023,995 B2 | 4/2006 | Olsson |
| 7,043,231 B2 | 5/2006 | Bhatia et al. |
| 7,058,594 B2 | 6/2006 | Stewart et al. |
| 7,069,319 B2 | 6/2006 | Zellner et al. |
| 7,085,555 B2 | 8/2006 | Zellner et al. |
| 7,103,368 B2 | 9/2006 | Teshima |
| 7,103,476 B2 | 9/2006 | Smith et al. |
| 7,106,843 B1 | 9/2006 | Gainsboro et al. |
| 7,110,749 B2 | 9/2006 | Zellner et al. |
| 7,116,977 B1 | 10/2006 | Moton et al. |
| 7,124,101 B1 | 10/2006 | Mikurak |
| 7,130,631 B2 | 10/2006 | Enzmann et al. |
| 7,139,722 B2 | 11/2006 | Perrella et al. |
| 7,155,199 B2 | 12/2006 | Zalewski et al. |
| 7,177,651 B1 | 2/2007 | Almassy |
| 7,181,225 B1 | 2/2007 | Moton et al. |
| 7,181,529 B2 | 2/2007 | Bhatia et al. |
| 7,188,027 B2 | 3/2007 | Smith et al. |
| 7,190,960 B2 | 3/2007 | Wilson et al. |
| 7,203,502 B2 | 4/2007 | Wilson et al. |
| 7,212,829 B1 | 5/2007 | Lau et al. |
| 7,224,978 B2 | 5/2007 | Zellner et al. |
| 7,236,799 B2 | 6/2007 | Wilson et al. |
| RE39,717 E | 7/2007 | Yates et al. |
| 7,245,925 B2 | 7/2007 | Zellner |
| 7,260,378 B2 | 8/2007 | Holland et al. |
| 7,272,493 B1 | 9/2007 | Hamrick et al. |
| 7,292,939 B2 | 11/2007 | Smith et al. |
| 7,295,924 B2 | 11/2007 | Smith et al. |
| 7,362,851 B2 | 4/2008 | Contractor |
| 7,383,052 B2 | 6/2008 | Moton et al. |
| 7,386,396 B2 | 6/2008 | Johnson |
| 7,787,887 B2 | 8/2010 | Gupta et al. |
| 9,560,506 B2 * | 1/2017 | Gudlavenkatasiva .. H04W 4/22 |
| 2001/0001239 A1 | 5/2001 | Stewart |
| 2001/0005864 A1 | 6/2001 | Mousseau et al. |
| 2001/0007450 A1 | 7/2001 | Begum |
| 2001/0021646 A1 | 9/2001 | Antonucci et al. |
| 2001/0028301 A1 | 10/2001 | Geiger et al. |
| 2001/0034709 A1 | 10/2001 | Stoifo et al. |
| 2001/0049275 A1 | 12/2001 | Pierry et al. |
| 2001/0051911 A1 | 12/2001 | Marks et al. |
| 2002/0035474 A1 | 3/2002 | Alpdemir |
| 2002/0035493 A1 | 3/2002 | Mozayeny et al. |
| 2002/0037709 A1 | 3/2002 | Bhatia et al. |
| 2002/0037722 A1 | 3/2002 | Hussain et al. |
| 2002/0037731 A1 | 3/2002 | Mao et al. |
| 2002/0037744 A1 | 3/2002 | Bhatia et al. |
| 2002/0037750 A1 | 3/2002 | Hussain et al. |
| 2002/0038362 A1 | 3/2002 | Bhatia et al. |
| 2002/0038384 A1 | 3/2002 | Khan et al. |
| 2002/0038386 A1 | 3/2002 | Bhatia et al. |
| 2002/0046069 A1 | 4/2002 | Mozayeny et al. |
| 2002/0046077 A1 | 4/2002 | Mozaveny et al. |
| 2002/0046090 A1 | 4/2002 | Stewart |
| 2002/0052781 A1 | 5/2002 | Aufricht et al. |
| 2002/0077083 A1 | 6/2002 | Zellner et al. |
| 2002/0077084 A1 | 6/2002 | Zellner et al. |
| 2002/0077118 A1 | 6/2002 | Zellner et al. |
| 2002/0077130 A1 | 6/2002 | Owensby |
| 2002/0077897 A1 | 6/2002 | Zellner et al. |
| 2002/0087335 A1 | 7/2002 | Meyers et al. |
| 2002/0090932 A1 | 7/2002 | Bhatia et al. |
| 2002/0091991 A1 | 7/2002 | Castro |
| 2002/0095312 A1 | 7/2002 | Wheat |
| 2002/0095454 A1 | 7/2002 | Reed et al. |
| 2002/0102993 A1 | 8/2002 | Hendrey et al. |
| 2002/0107027 A1 | 8/2002 | O'Neil |
| 2002/0120713 A1 | 8/2002 | Gupta et al. |
| 2002/0161637 A1 | 10/2002 | Sugaya |
| 2002/0174147 A1 | 11/2002 | Wang et al. |
| 2003/0003990 A1 | 1/2003 | Von Kohorn |
| 2003/0016233 A1 | 1/2003 | Charpentier |
| 2003/0018527 A1 | 1/2003 | Filepp et al. |
| 2003/0030731 A1 | 2/2003 | Colby |
| 2003/0140088 A1 | 7/2003 | Robinson et al. |
| 2003/0169151 A1 | 9/2003 | EblinQ et al. |
| 2004/0002329 A1 | 1/2004 | Bhatia et al. |
| 2004/0097243 A1 | 5/2004 | Zellner et al. |
| 2004/0111269 A1 | 6/2004 | Koch |
| 2004/0116131 A1 | 6/2004 | Hochrainer et al. |
| 2004/0151151 A1 | 8/2004 | Kubler et al. |
| 2004/0164898 A1 | 8/2004 | Stewart |
| 2004/0186902 A1 | 9/2004 | Stewart et al. |
| 2004/0201459 A1 | 10/2004 | Rich et al. |
| 2004/0203903 A1 | 10/2004 | Wilson et al. |
| 2004/0205198 A1 | 10/2004 | Zellner et al. |
| 2004/0228330 A1 | 11/2004 | Kubler et al. |
| 2004/0246940 A1 | 12/2004 | Kubler et al. |
| 2004/0252051 A1 | 12/2004 | Johnson |
| 2004/0264442 A1 | 12/2004 | Kubler et al. |
| 2004/0266453 A1 | 12/2004 | Maanoja et al. |
| 2005/0002419 A1 | 1/2005 | Doviak et al. |
| 2005/0004838 A1 | 1/2005 | Perkowski et al. |
| 2005/0017068 A1 | 1/2005 | Zalewski et al. |
| 2005/0043036 A1 | 2/2005 | Ioppe et al. |
| 2005/0050227 A1 | 3/2005 | Michelman |
| 2005/0060365 A1 | 3/2005 | Robinson et al. |
| 2005/0096067 A1 | 5/2005 | Martin |
| 2005/0114777 A1 | 5/2005 | Szeto |
| 2005/0151655 A1 | 7/2005 | Hamrick et al. |
| 2005/0246097 A1 | 11/2005 | Hamrick et al. |
| 2005/0272445 A1 | 12/2005 | Zellner |
| 2005/0283833 A1 | 12/2005 | Lalonde et al. |
| 2006/0009190 A1 | 1/2006 | Laliberte |
| 2006/0010202 A1 | 1/2006 | Blackstock et al. |
| 2006/0022048 A1 | 2/2006 | Johnson |

(56) References Cited

U.S. PATENT DOCUMENTS

| | | | |
|---|---|---|---|
| 2006/0030335 A1 | 2/2006 | Zellner et al. |
| 2006/0030339 A1 | 2/2006 | Zhovnirovsky et al. |
| 2006/0059043 A1 | 3/2006 | Chan et al. |
| 2006/0089134 A1 | 4/2006 | Moton et al. |
| 2006/0094447 A1 | 5/2006 | Zellner |
| 2006/0099966 A1 | 5/2006 | Moton et al. |
| 2006/0105784 A1 | 5/2006 | Zellner et al. |
| 2006/0106537 A1 | 5/2006 | Hamrick et al. |
| 2006/0136544 A1 | 6/2006 | Atsmon et al. |
| 2006/0164302 A1 | 7/2006 | Stewart et al. |
| 2006/0167986 A1 | 7/2006 | Trzvna et al. |
| 2006/0183467 A1 | 8/2006 | Stewart et al. |
| 2006/0189327 A1 | 8/2006 | Zellner et al. |
| 2006/0189332 A1 | 8/2006 | Benco et al. |
| 2006/0194589 A1 | 8/2006 | Sankisa |
| 2006/0195570 A1 | 8/2006 | Zellner et al. |
| 2006/0198359 A1 | 9/2006 | Fok et al. |
| 2006/0240828 A1 | 10/2006 | Jain et al. |
| 2006/0252465 A1 | 11/2006 | Karstens et al. |
| 2006/0253252 A1 | 11/2006 | Hamrick et al. |
| 2006/0286933 A1* | 12/2006 | Harkins ............... A42B 3/30 455/41.2 |
| 2007/0005188 A1 | 1/2007 | Johnson |
| 2007/0010260 A1 | 1/2007 | Zellner et al. |
| 2007/0042789 A1 | 2/2007 | Moton et al. |
| 2007/0105565 A1 | 5/2007 | Enzmann et al. |
| 2007/0124721 A1 | 5/2007 | Cowing et al. |
| 2007/0136603 A1 | 6/2007 | Kuecuekyan |
| 2007/0232326 A1 | 10/2007 | Johnson |
| 2007/0233387 A1 | 10/2007 | Johnson |
| 2007/0244633 A1 | 10/2007 | Phillips et al. |
| 2007/0250920 A1 | 10/2007 | Lindsay |
| 2007/0275730 A1 | 11/2007 | Bienas et al. |
| 2007/0276587 A1 | 11/2007 | Johnson |
| 2007/0281716 A1 | 12/2007 | Altman et al. |
| 2007/0287473 A1 | 12/2007 | Dupray |
| 2008/0030308 A1 | 2/2008 | Johnson |
| 2008/0071761 A1 | 3/2008 | Singh et al. |
| 2008/0096529 A1 | 4/2008 | Zellner |
| 2008/0170679 A1 | 7/2008 | Sheha et al. |
| 2008/0301561 A1 | 12/2008 | Bain |
| 2009/0054077 A1 | 2/2009 | Gauthier et al. |
| 2009/0067593 A1 | 3/2009 | Ahlin |
| 2009/0167524 A1 | 7/2009 | Chesnutt et al. |
| 2009/0190734 A1 | 7/2009 | White et al. |
| 2009/0233622 A1 | 9/2009 | Johnson |
| 2009/0233623 A1 | 9/2009 | Johnson et al. |
| 2009/0233633 A1 | 9/2009 | Johnson |
| 2010/0069035 A1 | 3/2010 | Johnson |
| 2010/0146160 A1 | 6/2010 | Piekarski |
| 2010/0159946 A1 | 6/2010 | Cheung et al. |
| 2010/0227595 A1 | 9/2010 | Johnson |
| 2010/0235748 A1 | 9/2010 | Johnson et al. |
| 2011/0021145 A1 | 1/2011 | Johnson et al. |
| 2012/0029314 A1* | 2/2012 | Paquet ............... A61B 5/02055 600/301 |
| 2013/0295872 A1* | 11/2013 | Guday ................. H04W 4/22 455/404.1 |
| 2014/0038668 A1* | 2/2014 | Vasavada ........... H04L 65/4061 455/556.1 |
| 2015/0297082 A1* | 10/2015 | Hoggle ................ G06Q 50/22 340/870.07 |

FOREIGN PATENT DOCUMENTS

| | | |
|---|---|---|
| EP | 917320 | 5/1999 |
| EP | 935364 | 8/1999 |
| EP | 924914 | 4/2003 |
| EP | 779752 | 6/2004 |
| EP | 1435749 | 7/2004 |
| EP | 1445923 | 8/2004 |
| EP | 838933 | 4/2008 |
| GB | 2396779 | 6/2004 |
| JP | 01-194628 | 8/1989 |
| JP | 03-128540 | 5/1991 |
| JP | 07-234789 | 9/1995 |
| JP | 07-288514 | 10/1995 |
| JP | 07-319706 | 12/1995 |
| JP | 08-44568 | 2/1996 |
| JP | 08-87296 | 4/1996 |
| JP | 11-168478 | 6/1999 |
| WO | WO 98/19484 | 5/1998 |
| WO | WO 99/16263 | 4/1999 |
| WO | WO 99/27716 | 6/1999 |
| WO | WO 99/51005 | 10/1999 |
| WO | WO 99/55012 | 10/1999 |
| WO | WO 00/02365 | 1/2000 |
| WO | WO 00/076249 | 12/2000 |
| WO | WO 02/11407 | 2/2002 |
| WO | WO 04/80092 | 9/2004 |

OTHER PUBLICATIONS

Andy Harter and Andy Hooper, A Distributed Location system for the Active Office, IEEE Network, Jan./Feb. 1994.

Max J. Eqenhofer, Spatial SOL: A Query and Presentation Language, IEEE Network, Feb. 1994.

Mike Spreitzer and Marvin Theimer, Providing Location Information in a Ubiquitous Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

Ronald Azuma, Trackinq Requirements for Augmented Reality, Communications of the ACM, vol. 36 No. 1, Jan. 1992.

Roy Want, etal., The Active Badge Location System, ACM Transactions on Information Systems, vol. 10, No. 1, Jan. 1992.

Marvin White, Emerging Requirements forDigital MapsforIn-Vehicle Pathfinding and OtherTravellerAssistance, Vehicular Navigation and Information Systems Conference Proceedings, Part 1, Oct. 19_91.

Fred Phail, The Powerofa Personal ComputerforCarinformation and Communications Systems, Vehicular Navigation and Information Systems Conference Proceedings, Part 1, Oct. 19_91.

Thomas A. Dingus, etal., Human Factors Engineering the TravTek Driverinterface, Vehicular Navigation and Information Systems Conference Proceedings, Part II, Oct. 1991.

Michael Muffat et al., European Cooperation on Dual Mode Route Guidance Perspectives forAdvanced Research Partners, Vehicular Navigation and Information Systems Conference Proceedings, Part II, Oct. 1991.

MobileStar Network, MobileStar Network First to Provide Business Travelers with High-Speed Data Access via the Internet—Wirelessly, New York, NY, Jun. 24, 1998.

Harry Chen, et al.,"Dynamic Service Discovery for Mobile Computing: Intelligent Agents Meet Jini in the Aether," Cluster Computing, Special Issue on Internet Scalability, vol. 4, No. 4, Feb. 2001.

Trembly, A., "Wireless products arm road warriors," National Underwriter, vol. 105, No. 3, pp. 23-25, Dialog 0211357767213220 (Jan. 2001).

Antonio, Interfaces and Algorithms for a Wide-Area Event Notification Service, Oct. 1999.

\* cited by examiner

SYSTEM AND METHOD FOR VITAL SIGNS ALERTING PRIVILEGED RECIPIENTS

CROSS-REFERENCES TO RELATED APPLICATIONS

This application is a continuation of application Ser. No. 14/041,292 filed Sep. 30, 2013 and entitled "System and Method for Situational Proximity Observation Alerting Privileged Recipients". The entire specification from the aforementioned application Ser. No. 14/041,292 is included herein in original form, except for modifications resulting from an Amendment filed Aug. 7, 2015 to modify two minor syntactical errors. The title, abstract, and claims herein are uniquely indicative of the continuation.

TECHNICAL FIELD

The present disclosure relates generally to situational proximity observations by a mobile data processing system using one or more automated senses of the mobile data processing system, and more particularly to situational proximity observations by a mobile data processing system for alerting privileged recipients of potentially being involved in, or affected by, the sensing by the one or more automated senses.

BACKGROUND

Different users use different types of Mobile data processing Systems (MSs) which are also called mobile devices: laptops, tablet computers, Personal Computers (PCs), Personal Digital Assistants (PDAs), cell phones, automobile dashboard mounted data processing systems, shopping cart mounted data processing systems, mobile vehicle or apparatus mounted data processing systems, Personal Navigational Devices (PNDs), Android enabled devices, iPhones (iPhone is a trademark of Apple, Inc.), iPads (iPad is a trademark of Apple, Inc.), and other various handheld mobile data processing systems, etc. A Mobile data processing System (MS) may be equipped with a variety of features such as a feature for capturing photos in a line of sight proximity of the MS, capturing videos in a line of sight proximity of the MS, capturing audio in an audio range of the MS, or sampling the environment in the proximity of the MS using a variety of sensing methods or systems in which the MS is equipped. Depending on the MS and what is in proximity of the MS at a particular time when sensing occurs, other MSs in or near the same proximity may also be involved. When a MS samples the environment with a sensing means or method (picture, video, audio, etc.—see below), that sample may be relevant for other MSs which are in or near the same proximity at the particular time. For example, a user takes a picture of someone in the audience at a football game. It is possible that people are inadvertently captured in the picture taken (for example in background, foreground, or in sides of picture, etc). In another example, a user takes a video at a crowded conference event. It is possible that people are inadvertently captured in the video taken (for example in background, or some other portion of video as it is panned by the user shooting the video, etc.). Assuming a reasonable density of MSs in a particular proximity of the MS capturing the picture or video, and assuming the locations of the MSs are known, it may be desirable to alert associates that they may have been captured intentionally or unintentionally in the picture or video taken, or at a variety of other times, or in accordance with a variety of other events, for example when the picture or video is saved, uploaded to a service, or shared. While the picture and video examples are provided to simplify understanding for the reader, there are many embodiments herein.

Depending on the sensing method or system carried out by the MS, people who may be involved in, or affected by, being sensed by someone else's MS may want to know about it for a variety of reasons, and perhaps in accordance with a variety of privileges and/or conditions between users. The Location Based Exchange (LBX) family of patent applications (Ser. No. 12/807,806 filed Sep. 14, 2010 and entitled "System and Method for Targeting Data Processing System(s) With Data"; Ser. Nos. 12/800,394 and 12/800,395 each filed May 14, 2010 and entitled "System and Method for Automated Content Presentation Objects" and "System And Method For Automatically Leaving An Outgoing Caller Message", respectively; Ser. No. 12/590,831 filed Nov. 13, 2009 and entitled "System and Method for Location Based Exchanges of Data Facilitating Distributed Locational Applications"; Ser. No. 12/287,064 filed Oct. 3, 2008 and entitled "System and Method for Location Based Exchanges of Data Facilitating Distributed Locational Applications"; and Ser. No. 12/077,041 filed Mar. 14, 2008 and entitled "System and Method for Location Based Exchanges of Data Facilitating Distributed Locational Applications") by one of the present Applicants cover purely peer to peer, as well as centralized services, processing as it relates to location based processing in every layer of resource of a MS. The LBX family of applications has disclosed MS sensing methods and systems (and with applicable privilege and condition embodiments), such as those including:

The MS senses its location using a comprehensive set of locating methods and systems thereby making the MS a chameleon in making use of the best location technology available at any time, regardless of being indoors, outdoors, or at a challenging location for location determination requiring recycling collected information for determining a location (e.g. Recursive Whereabouts Determination);

The MS senses its location (graphically locates itself) by recognizing its own location based on data captured in its aperture, for example data from a picture, or video, or during use in panning potential subject(s), etc. wherein text, landmarks, color, other discernible artifacts, etc. in photographic frame(s) are interpreted;

The MS senses other data processing systems (e.g. this includes other MSs, RFID devices, MS emulations, etc.) in its proximity using a variety of methods, systems, and criteria (e.g. privileges, conditions, etc);

The MS senses services unavailable directly to it, however services available to it made available through one or more other "hop" MSs in the proximity (i.e. service propagation) in order to get to the desired service;

The MS senses an inventory of things in its proximity for location based inventory management;

The MS senses its environment to determine whereabouts, for example when being equipped with environment sensing devices for setting AppTerm variables which are accessed for unique charter processing, and for example light, sound levels, etc. reaching certain sensed values as described in a charter expression so that charter action(s) can be performed automatically;

The MS senses location based information in support of a data processing system clipboard cut/copy and paste of the location based information for edit of a variety of work products, for example to add the location based information to a data entry field, picture, video frame, etc.;

The MS senses transactional related information (involved in making a purchase) while in vicinity/proximity of a device accepting purchase, and as part of that transaction, the MS is notified with results (e.g. its location), or alternatively the MS itself accepts purchase and senses its location as part of that processing;

The MS senses by having "touching sensors", or the MS is communicated to by systems incorporating "touching sensors" for performing the sensing;

The MS, or housing with MS, is sensed by its odor (or host/housing having MS), perhaps an odor indicating where it had been, where it should not be, or where it should be, the MS being notified with results (e.g. its location), or alternatively the MS itself senses odor as equipped;

The MS is sensed with optical sensing, the MS being notified with results (e.g. its location), or alternatively the MS itself senses with optical sensing as equipped; and/or The MS carries out other sensing as disclosed in the LBX application(s) depending on the capabilities of a particular MS.

SUMMARY

Provided is a system and method for a situational proximity observation by a Mobile data processing System (MS) using one or more automated senses of the MS, for example as directed by a user of the MS, to cause an alert to be delivered to one or more other Mobile data processing Systems (MSs) for notifying those other users of the MSs that they are potentially involved in, or affected by, the sensing carried out by the MS making the observation. A user may or may not be directly involved when a MS makes a situational proximity observation. Situational Proximity ObservaTion (SPOT) examples include:

Data captured (i.e. sensed) by a MS using any/all sensing, for example through a sensor or through detecting, determining, distinguishing, receiving, processing, analyzing, or predicting, and as discussed in the LBX applications (including those described above), with or without a user action for doing the capture;

Photographic or picture data captured (i.e. sensed) by a MS, for example when a user of the MS takes a picture of something and/or someone in the MS environment (i.e. in proximity of the MS);

Video data captured (i.e. sensed) by a MS, for example when a user of the MS takes a video of something and/or someone in the MS environment (i.e. in proximity of the MS), with or without audio;

Audio data captured (i.e. sensed) by a MS, for example when a user of the MS records sound in the MS environment (i.e. in proximity of the MS);

Atomic, molecular, atmospheric, or environmental data captured (i.e. sensed) by a MS when capturing some detectable presence (or lack of) in the environment, for example when a user of the MS uses applicable capabilities of the MS to detect presence of, or lack of, radiation, smoke, particular gasses, particular germs, particular temperature, or other environmental data (i.e. in proximity of the MS);

MS location related data captured (i.e. sensed) by a MS, for example speed, altitude, heading, relative distance, absolute distance, etc., for example when a user of the MS travels with the MS, and perhaps in combination or context of other sensing;

MS force, gravity, posture, inertial measurement or motion/movement data, or related data thereof, captured (i.e. sensed) by a MS, for example when capturing some orientation of the MS at some time, and for example using an accelerometer, compass, gyroscope, two or three dimensional force detection, or speed detection, and/or acceleration detection, etc. for example when a user of the MS uses the MS, and perhaps in combination or context of other sensing performed;

MS force, gravity, posture, inertial measurement or motion/movement related data captured (i.e. sensed) by a MS, for example when capturing pressure (e.g. under water, or atmospheric) or other detectable visible or invisible forces involving the MS at some time, and for example elevation/altitude/depth, manometer measurement(s), barometer measurement(s), diaphragm measurement(s), transducer measurement(s), ion detection measurement(s), differential measurement(s), electron detection measurement(s), magnetic measurement(s), sphygmometer measurement(s) or other health monitor (e.g. heart rate and/or rhythm) or measurement(s) (e.g. of MS user), and perhaps in combination or context of other sensing performed;

MS sampled data captured (i.e. sensed (e.g. a taste emulation)) by a MS when capturing a litmus or contact test by a MS so equipped, for example when a user of the MS uses a MS capability to test an environment sample (i.e. in proximity of MS);

MS Artificial Intelligence (AI) data determined (i.e. sensed) by a MS when processing one or more data instances or samples for the MS to anticipate a forthcoming event or situation in the environment (i.e. in proximity of the MS), for example in making automated inferences or predictions using data sensed by the MS;

Shooter data captured (i.e. sensed) when shooting (e.g. the aim related data of application fields appfld.shoot.X) as described in Ser. No. 12/807,806); and/or Any combination of: above examples, similar examples, or subset(s) thereof.

There are many well known sensing technologies that can be coupled to a MS for enhancing the MS with sensing capabilities that emulate God given human senses, as well as man-created technological senses relevant to a particular MS embodiment. This disclosure is not to be limited by any particular sensing embodiment. Consider an example embodiment where a smart phone or useful MS is equipped with poisonous gas detection (i.e. sensing method, system or means) for facilitating people on the ground in the Syria confrontation (at time of this writing) being made aware of poisonous gasses in their area. A soon as one user's MS senses the poisonous gas, many other users in the proximity can be instantly alerted to take cover and precautions. In another example, a MS monitors one or more health vital signs of the MS user. When the MS detects a concern, the user's family can be instantly notified, for example to take emergency measures. There are many embodiments for the present disclosure depending on a particular application, the sensing technologies coupled to the MS, and the need for alerting others based on sensed data of one particular MS. Preferably, a Situational Proximity ObservaTion (SPOT) captures data for something, someone, or the MS user himself, in proximity of the MS.

In some embodiments, a Situational Proximity Observation (SPOT) involves sampling data of the environment in a variety of ways, depending on how the MS is equipped and what, or who (including the MS user himself), is in the proximity of the MS at the time. In some embodiments, a SPOT involves capturing data in the proximity of the MS with one or more, or a combination of, automated emulation(s) of human senses (e.g. sight (e.g. picture/video), hearing (e.g. audio), touch (e.g. pressure/temperature), taste (e.g. contact sample), smell (e.g. gas detection), or premonition (e.g. anticipating a future event with AI)), as well as one or more, or a combination of, man-made sensing technologies, some of which are described above.

Other MSs which are in the proximity of the MS making the SPOT can be delivered a notification (alert) when the SPOT is potentially of interest. User(s) can be alerted when their associate (e.g. a member of a socially related group, for example a user who may be a friend, colleague, team-member, acquaintance, comrade, pal, pingPal™, peer, buddy, family member, fellow employee, or some other socially related associate, etc) travels with a MS which makes a SPOT that is of interest for potentially involving, or affecting, the user(s). Preferably, a social relationship is configured for defining the user association, for example Facebook friends, Twitter followers, LinkedIn contacts, Location Based Exchange (LBX) relationships as embodied by privileges or charters, associates made relevant via a reasonable social service for associating users, or some other system, method or means for associating users in a relevant group.

A Situational Proximity Observation Device Reporter (SPODR) senses or captures the environment within the MS proximity and a TRaveling Observation Device Recipient (TRODR) can be notified/alerted when the SPODR may have sensed or captured data relevant to the TRODR. There is a variety of events and conditions under which a notification/alert is provided, including in accordance with a variety of privileges configured between users. The disclosed terminology "SPODR" is pronounced like "spotter", and the disclosed terminology "TRODR" is pronounced like the word "trotter".

Depending on a particular hardware point of view, a SPODR is an MS, or a hardware portion of a MS, which can carry out a SPOT benefiting at least one TRODR. Depending on a particular software point of view, a SPODR is an embodiment of processing by a MS for carrying out a SPOT benefiting at least one TRODR. From a user point of view, a SPODR is a user who uses his MS (intentionally or unintentionally) to make a SPOT benefiting at least one TRODR. Depending on a particular hardware point of view, a TRODR is an MS, or a hardware portion of a MS, which receives the notification/alert resulting from the SPOT by the SPODR. Depending on a particular software point of view, a TRODR is an embodiment of processing by a MS for receiving the notification/alert resulting from the SPOT by the SPODR. From a user point of view, a TRODR is a user who receives the notification/alert resulting from the SPOT by the SPODR. Of course, any MS can be both a SPODR and TRODR. An "s" suffix is used to indicate a plurality, for example SPODRs (i.e. Situational Proximity Observation Device Reporters) and TRODRs (i.e. TRaveling Observation Device Recipients).

It is an advantage to notify/alert one or more users (i.e. associate(s) and TRODR(s)) when a MS of another user (i.e. a SPODR) in the same social group makes a SPOT of interest to the one or more other users (i.e. associate(s) and TRODR(s)) that may involve, or affect, the one or more other users.

It is another advantage to maintain permissions/privileges between users for governing the SPODR events which cause TRODR notifications/alerts, and to support many SPODR and/or TRODR conditions for circumstances under which alerts occur. Such conditions may be evaluated by the SPODR, TRODR or centralized service middle-manning processing at the time of sensing, at the time of being alerted, or at another suitable time in present disclosure processing.

It is another advantage to support configurations for how the notifications are delivered and what should be delivered in the notifications.

It is another advantage to exploit the capabilities of a particular MS so that a SPODR SPOT uses any of a variety of the embodiments discussed above, and similar embodiments that may be pursued.

It is another advantage to deploy Virtual Vector (VV) determination for determining one or more TRODRs that should be notified of a particular SPOT. A VV is as defined in Ser. No. 12/807,806 entitled "System and Method for Targeting Data Processing System(s) With Data". Moreover, shooter data defined in Ser. No. 12/807,806 (see appfld-.shoot.X aim related data) entitled "System and Method for Targeting Data Processing System(s) With Data" which can be shot at a target data processing system defines a focus field of view to determine one or more TRODRs.

Another advantage is maintaining of statistical data for why, how, when, and where TRODR and SPODR related processing takes place, and who is involved with that related processing. This provides means for reporting, and perhaps as maintained by a centralized service to facilitate reporting amongst a large population of users.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

DESCRIPTION OF DRAWINGS

There is no guarantee descriptions in this specification explain every novel feature found in the drawings. The present disclosure will be described with reference to the accompanying drawings, wherein:

FIG. 7B depicts an illustration describing one preferred embodiment of taking a photo or video using a MS wherein there is a field of view;

DETAILED DESCRIPTION

Figure 1A:
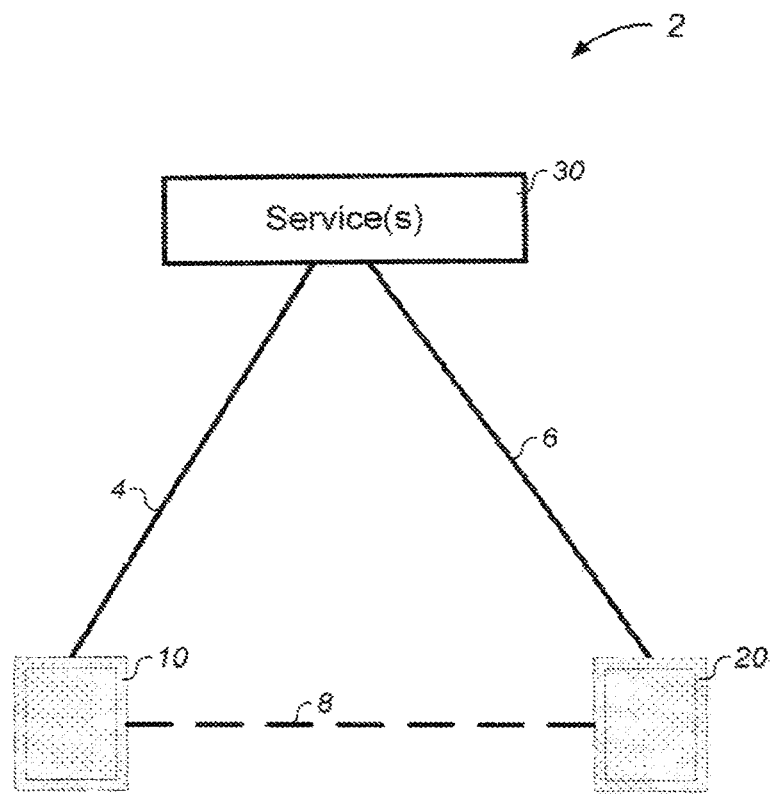
FIG. 1A depicts an architectural diagram facilitating interoperability discussion of the present disclosure.

With reference now to detail of the drawings, the present disclosure is described. Obvious error handling is omitted from the flowcharts in order to focus on key aspects. A thread synchronization scheme (e.g. semaphore use) is assumed where appropriate. A semicolon may be used in flowchart blocks to represent, and separate, multiple blocks of processing within a single physical block. This allows simpler flowcharts with less blocks in the drawings by placing multiple blocks of processing description in a single physical block of the flowchart. Flowchart processing is intended to be interpreted in the broadest sense by example, and not for limiting methods of accomplishing the same functionality. Disclosed user interface processing and/or screenshots are also preferred embodiment examples that can be implemented in various ways without departing from the spirit and scope of this disclosure. Alternative user interfaces (since this disclosure is not to be limiting) will use similar mechanisms, but may use different mechanisms without departing from the spirit and scope of this disclosure. Novel features disclosed herein need not be provided as all or none. Certain features may be isolated in some embodiments, or may appear as any subset of features and functionality in other embodiments.

FIG. 1A depicts an architectural diagram 2 facilitating interoperability discussion of the present disclosure. A SPODR 10 may communicate data or information described below by way of a communications path 4 to a centralized service 30 (e.g. Facebook, Twitter, or some other centralized service) to cause an alert communicated by way of communications path 6 from the centralized service 30 to TRODR 20. Alternatively, SPODR 10 may communicate an alert by way of a communications path 8 directly to TRODR 20 in a peer to peer embodiment (e.g. an LBX embodiment). There may be many SPODRs 10 and TRODRs 20 connected to centralized service 30, or in direct communications with each other. A single MS may be a SPODR or TRODR at any particular time. Connections 4, 6, 8 and any other communications paths (connections) herein may span large geographical distances, for example over an internet topology, albeit that the TRODR for a particular SPOT by a SPODR implies the TRODR is preferably in a reasonable proximity range of the SPODR at the time of the SPOT as described below, and depending on the type of SPOT. The large geographical distances may also involve a variety or protocols, telephony embodiments, switches, hubs, router configurations, or the like to get data from one place to another, as well known to those skilled in the art. Bidirectional paths/connections may be used, or separate unidirectional communications paths/connections may be used, all of which may be over unique topologies of software and hardware to accomplish a communications path.

Figure 1B:
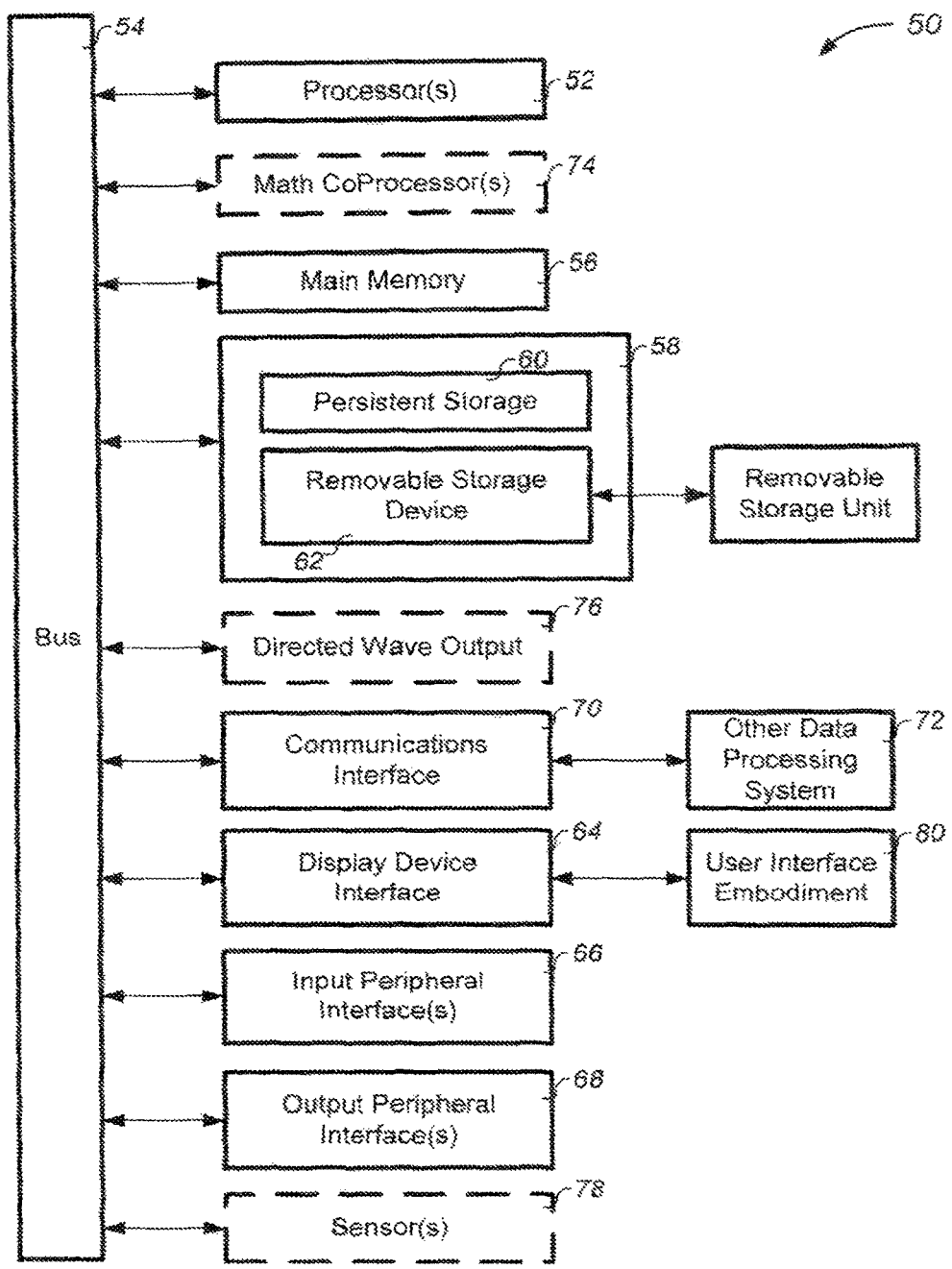
FIG. 1B depicts a block diagram of a data processing system useful for implementing a MS, a service, or any data processing system carrying out disclosed processing or functionality.

FIG. 1B depicts a block diagram of a data processing system useful for implementing any SPODR, TRODR, service, or other data processing systems disclosed herein. Dashed lines general indicate components of a SPODR or TRODR, and components that may not be found in a centralized service 30. A device or system (e.g. a mobile data processing system) accessing any user interface (e.g. Graphical User Interface (GUI)) of the present disclosure may also be a data processing system 50. A MS, TRODR, or SPODR is not required to access some disclosed user interfaces (e.g. use any data processing system for configuration of FIG. 5). A data processing system 50 includes at least one processor 52 (e.g. Central Processing Unit (CPU)) coupled to a bus 54. Bus 54 may include a switch, or may in fact be a switch 54 to provide dedicated connectivity between components of data processing system 50. Bus (and/or switch) 54 is a preferred embodiment coupling interface between data processing system 50 components. The data processing system 50 also includes main memory 56, for example, random access memory (RAM). Memory 56 may include multiple memory cards, types, interfaces, and/or technologies. The data processing system 50 may include secondary storage device(s) 58 such as persistent storage 60, and/or removable storage device 62, for example as a compact disk, floppy diskette, USB flash, or the like, also connected to bus (or switch) 54. In some embodiments, persistent storage devices could be remote to the data processing system 50 and coupled through an appropriate communications interface. Persistent storage 60 may include flash memory, disk drive memory, magnetic, charged, or bubble storage, and/or multiple interfaces and/or technologies, perhaps in software interface form of variables, a database, shared memory, etc.

The data processing system 50 may also include a display device interface 64 for driving a connected display device (not shown) and user interface embodiment 80. The data processing system 50 may further include one or more input peripheral interface(s) 66 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 66. The data processing system 50 may still further include one or more output peripheral interface(s) 68 to output devices such as a printer, facsimile device, or the like. Output peripherals may also be available via an appropriate interface.

Data processing system 50 will include communications interface(s) 70 for communicating to another data processing system 72 via analog signal waves, digital signal waves, radio waves, sound waves, infrared proximity, copper wire, optical fiber, or other useful wave spectrums. A data processing system 50 may have multiple communications interfaces 70 (e.g. cellular connectivity, 802.x, Bluetooth, LAN/MAN/WAN interface, etc). Other data processing system 72 may be another data processing system 50, or a mobile data processing system. Other data processing system 72 may be a service, or centralized service 30.

Data processing system programs (also called control logic) may be completely inherent in the processor(s) 52 being a customized semiconductor, or may be stored in main memory 56 for execution by processor(s) 52 as the result of a read-only memory (ROM) load (not shown), or may be loaded from a secondary storage device into main memory 56 for execution by processor(s) 52. Such programs, when executed, enable the data processing system 50 to perform features of the present disclosure as discussed herein. Accordingly, such data processing system programs represent controllers of the data processing system.

In some embodiments, the disclosure is directed to a control logic program product comprising at least one processor 52 having control logic (software, firmware, hardware microcode) stored therein. The control logic, when executed by processor(s) 52, causes the processor(s) 52 to provide functions of the disclosure as described herein. In another embodiment, this disclosure is implemented primarily in hardware, for example, using a prefabricated component state machine (or multiple state machines) in a semiconductor element such as a processor 52. Furthermore, data processing system 50 may include at least one math coprocessor 74 for expedient mathematical calculations. The different embodiments for providing control logic, processor execution, processing code, executable code, semiconductor processing, software, hardware, combinations thereof, or the like, provide processing means for the present disclosure, for example as described herein, and by flowcharts.

Those skilled in the art will appreciate various modifications to the data processing system 50 without departing from the spirit and scope of this disclosure. A data processing system preferably has capability for many threads of simultaneous processing which provide control logic and/or processing. These threads can be embodied as time sliced threads of processing on a single hardware processor, multiple processors, multi-core processors, Digital Signal Processors (DSPs), or the like, or combinations thereof. Such multi-threaded processing can concurrently serve large numbers of concurrent tasks. Concurrent processing may be provided with distinct hardware processing and/or as appropriate software driven time-sliced thread processing. Those skilled in the art recognize that having multiple threads of execution is accomplished in many different ways without departing from the spirit and scope of this disclosure. This disclosure strives to deploy software to existing hardware configurations, but the disclosed software can be deployed as burned-in microcode to new hardware.

Data processing aspects of drawings/flowcharts are preferably multi-threaded so that processing performs as needed in a timely and optimal manner. Data processing system 50 may also include its own clock mechanism (not shown), if not an interface to an atomic clock or other clock mechanism, to ensure an appropriately accurate measurement of time in order to appropriately carry out processing described below. In some embodiments, Network Time Protocol (NTP) is used to keep a consistent universal time for data processing systems in communications with data processing system 50. However, appropriate time conversions are made to accommodate different data processing systems 50 in different time zones.

One or more optional math coprocessor(s) 74 provide a set of interfaces for very fast mathematical calculations. Those skilled in the art appreciate that optimal mathematical calculation (e.g. floating point) speeds are best accomplished in an interfaced customized hardware component.

Data processing system 50 may also include one or more directed wave output interfaces 76, for example to shoot data using processing of Ser. No. 12/807,806 referenced above, or in using well known infrared, laser, or other directable wave forms that are already aim-able in nature. A directed wave input interface (not shown) is preferably maximized over the MS housing and may form the MS housing itself when the directed wave input interface is provided to data processing system 50.

Data processing system 50 will include one or more sensor(s) 78. Sensor(s) include, and are not limited to, the sensors involved in sensing examples discussed above. There are many sensors, and varieties of sensors to carry out a SPOT. For example, data processing system 50 may include Electronic Distance Measurement EDM means for targeting with a known distance to the subject, and may also include means for determining a field of view, or depth of field, as defined in photography applications.

Figure 2:
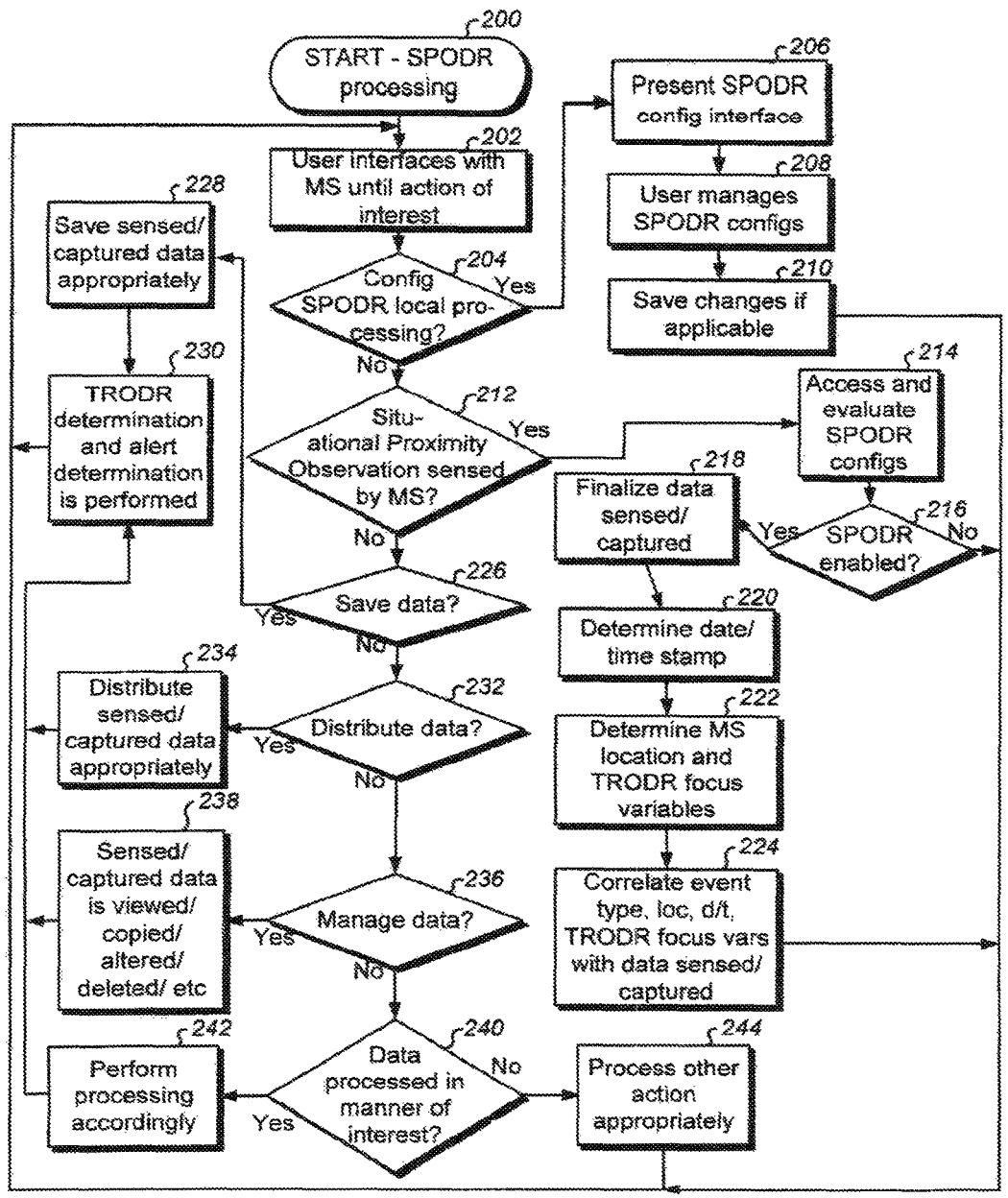
FIG. 2 depicts a flowchart for describing a preferred embodiment of SPODR processing.

FIG. 2 depicts a flowchart for describing a preferred embodiment of SPODR processing. MS processing of interest begins at block 200 and continues to block 202 where the user interfaces with the MS until a user action of interest to the present disclosure is performed by the user, in which case processing continues to block 204.

If block 204 determines the user selected to configure SPODR local processing, then block 206 presents a suitable user interface and the user manages local SPODR configurations at block 208 until satisfied with any changes. Thereafter, block 210 saves any changes made by the user, and processing continues back to block 202. Local SPODR configurations may be saved only local to the MS, or saved to the centralized service 30, or saved in both systems. Local SPODR configurations include:

- Enabling or disabling all SPODR sensing for a SPOT;
- Enabling or disabling any subset of SPODR sensing capability for a SPOT;
- Enabling or disabling actions or events which can cause a SPOT, with or without a user action; and/or
- Qualification criteria for qualifying with conditions when to permit, or prevent, all or some subset of SPODR sensing capability for a SPOT, such qualification criteria including specifications for one or more conditions including a location, a situational location, a geofenced area or region, an environmental condition, an evaluable expression with or without terms and operators (e.g. an LBX charter conditional expression, or analogous portion thereof), a condition in the vicinity or proximity of the MS, a user condition, a data processing system condition, a data processing system performance condition, a data processing system resource condition, an application condition, a service or centralized service 30 condition, a triangulation condition, a date and/or time condition, a permission/privilege condition, a transmission or communication condition, an aiming condition, a speed condition, a user interface condition, a database condition, an elevation or altitude condition, a storage condition, a peripheral condition, an environmental condition, a phone call condition, an inventory condition, an RFID device condition, a group condition, an associate condition, a data processing system clipboard condition, a file system condition, a Map Term condition (i.e. see Ser. No. 12/590,831 filed Nov. 13, 2009 and entitled "System and Method for Location Based Exchanges of Data Facilitating Distributed Locational Applications"), a statistical condition, an email application condition, a messaging application condition, a calendar application condition, an address book application condition, a phone application condition, a map application condition, a storage application condition, a file system application condition, a database application condition, a search application condition, an internet browser application condition, a historical data condition, a geofence specification condition, a nearby specification condition, a nearness specification condition, a condition using a distance, a vicinity specification condition, a file condition, a directory condition, an SQL database condition, a group, a condition involving a plurality of data processing systems, an arrival condition, a departure condition, a profile condition, an XML language condition, an HTML language condition, a programming language condition, a point condition, a radius condition, a perimeter condition, a spherical condition, a region condition, a Boolean value condition, a physical address condition, a logical address condition, an emergency application condition, a RFID application condition, a hotspot application condition, a traffic application condition, a mechanical or electrical appliance condition, a mechanical or electrical device condition, a mechanical or electrical appliance application condition, a mechanical or electrical device application condition, an account management application condition, a public transportation application condition, a carpool application condition, an advertising application condition, a news application condition, a picture application condition, a video application condition, a parking lot application condition, an employment application condition, a real estate application condition, a line, a polygon, a mathematical coordinate system, a specification condition described by a set of geographical coordinate system points, a specification condition described by a set of spatial coordinate system points, an identifier information condition, a waymark condition, a deliverable content condition, a direction, condition for data sent, condition for data to notify with, condition for data composed, condition for data to found or to find, condition for data to copy or move or change, condition for an executable to invoke, condition for data to discard, condition for data to store, an administration condition, a phone number, a web link, a user interface indicator, a document, a database object, a semaphore, a cursor, a container object, Artificial Intelligence (AI) processing/configuration(s)/method(s), a plurality of any of the foregoing and/or in any combinations thereof.

Figure 5:
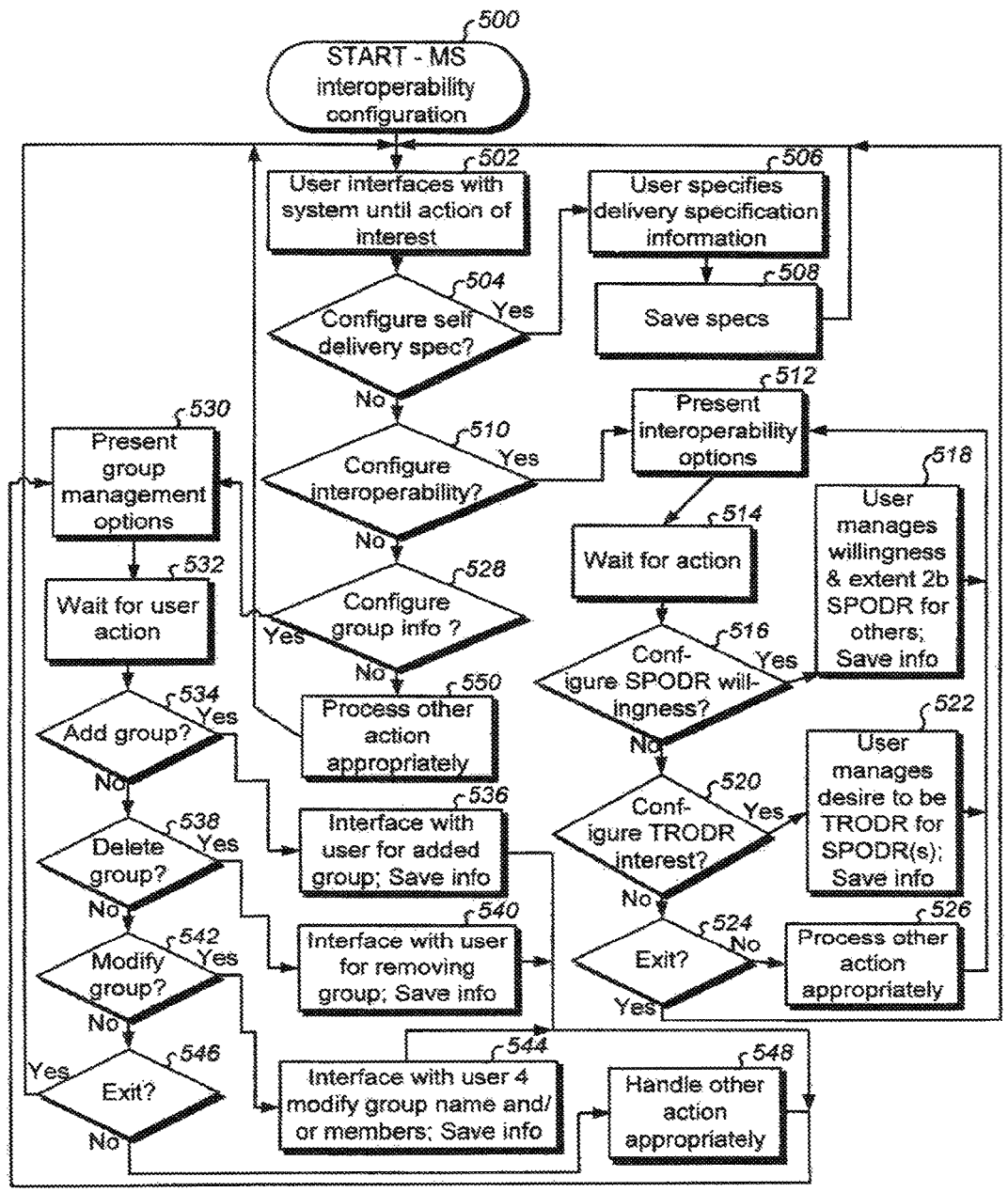
FIG. 5 depicts a flowchart for describing a preferred embodiment of MS interoperability configuration processing.

In some embodiments, local SPODR configurations may override equivalent FIG. 5 user configurations for ultimate SPODR control, while in other embodiments FIG. 5 configurations may override equivalent local SPODR configurations. In some embodiments, local SPODR configurations are always distinct from FIG. 5 configurations. In some embodiments, there are no local SPODR configurations to manage in which case all configurations are performed with FIG. 5 processing. In other embodiments, a user's authority or security level indicates which user overrides which other user's configurations. Depending on the embodiments, centralized service 30 will ensure configuration data is communicated and stored where needed, or a MS will ensure data is communicated and stored where needed.

With reference back to block 204, if it is determined the user did not select to configure local SPODR configurations, then processing continues to block 212. If block 212 determines the user caused the MS to perform a SPOT (per the many examples provided above), then block 214 accesses the local SPODR configurations to determine if the SPOT should be processed for the potential benefit of one or more TRODRs by interrogating and evaluating the local SPODR configurations. Thereafter, if block 216 determines SPODR processing should occur for the potential benefit of one or more TRODRs, then processing continues to block 218, otherwise processing continues back to block 202. Block 218 finalizes the particular SPOT data, and continues to block 220 for determining a current system date/time stamp (SPOT start date/time stamp already determined at encounter of block 220 when a period of time was required for a SPOT), block 222 for determining a location and focus variables of the MS of FIG. 2 processing at the time of the SPOT, block 224 for correlating the SPOT type (e.g. take photo, record audio, any of the many type of examples described above) as well as the location, date/time information, and focus variables from block 222 with the SPOT data sensed/captured. Thereafter, processing continues back to block 202. Processing of blocks 218 through 224 completes capture of all relevant information for enabling the SPODR SPOT to benefit one or more TRODRs. Focus variables facilitate defining a proximity range from the location of the MS of FIG. 2 processing, a proximity range constrained with a distance from the location of the MS of FIG. 2 processing, or a proximity range within a field of view from the perspective of the MS of FIG. 2 processing (e.g. aperture field of view, or shooter field of view) for further qualifying candidate recipient TRODRs potentially involved in, or affected by, the SPOT. Focus variables depend on the type of SPOT, some may be hard-coded or may be determined dynamically, or may be determined with AI (e.g. with access to SPOT related information in order to make a determination). In some embodiments, each SPOT type discussed above has a predefined range in advance. A focus requiring a field of view is determined in real time, for example for a picture, video, or shooter. Focus variables may include ready to use range and field of view information, or data useful for determining that information in subsequent processing, such as:

- A proximity range around the location of the MS of FIG. 2 processing, at the time of the SPOT;
- A proximity range within a specified distance around the location of the MS of FIG. 2 processing, at the time of the SPOT;
- EDM information;
- A field of view from the perspective of the MS of FIG. 2 processing (e.g. visual field of view (e.g. photograph or video frame(s)) or shooter field of view (e.g. Ser. No. 12/807,806));
- Information for, or associated with, one or more sensor(s) 78 per sensing and SPOT examples discussed above (multiple sensors may be involved in a SPOT);
- Accelerometer measurement(s), compass measurement(s), gyroscope measurement(s), two or three dimensional force measurement(s), speed measurement(s), acceleration measurement(s), MS usability measurement(s), MS orientation or posture measurement(s) of MS at time of SPOT, etc.;

Force measurement(s), gravity measurement(s), posture measurement(s), inertial measurement(s), motion/movement measurement(s), pressure measurement(s), measurement(s) for other detectable visible or invisible forces involving the MS at the time of the SPOT, elevation/altitude/depth measurement(s), a meter or gauge or sensor 78 detection measurement(s), etc.;

Field of view zoom factor, view pixel extents relative known resolution extents, focus depth of field information, and other photography field of view criteria;

Shooter and posture information, as defined in Ser. No. 12/807,806 (see appfld.shoot.X aim related data) entitled "System and Method for Targeting Data Processing System(s) With Data";

Information for qualification criteria defined above, for example to subsequently compare with configurations as discussed below; and/or Any combinations thereof.

While a SPOT may involve a single snapshot of data by a sensor (e.g. a particular date/time stamp), a significant amount of data may be collected for a plurality of sensors used in a single SPOT, and there may be a period of time for data collected, for example from a start time to an end time. A very large amount of data may be collected, for example, when using the mathematical models exemplified by FIGS. 7C through 7F to collect aim data during a SPOT period of time (e.g. video) which may have involved the MS being directed in many different aim postures during SPOT (e.g. record) time. Thus, in some embodiments, a maximum period of SPOT time may be enforced by FIG. 2 processing to prevent excessively large amounts of data for collection. In other embodiments, only certain types of SPOTs are supported, and perhaps in accordance with MS capabilities (e.g. pictures only, no videos supported).

In some embodiments, applications, or for a certain SPOT type, the range is undefined (or infinite) whereby the user action, event, privilege, or qualification criteria is dominant for processing the SPOT. Thus, a TRODR may be located anywhere at the time of the SPOT. However, when the TRODR is within a focus (range, or field of view) during the SPOT, interesting applications result. Range or distance values may be defined for a SPOT type, may be configured by a user as a preference (e.g. block 506), or may be configured by a user as a specific preference for certain SPOT types, or at certain times, or given certain qualification criteria. Similarly, the SPODR may analogously control range distance information (e.g. block 208). If there is a conflict between preferences (equivalent configurations between different users), a variety of overriding schemes are used, as already discussed herein. Also, range embodiments need not be circular/spherical, and may be in terms of a location resolved geocoded location identifier, or reference, which can be compared to an automatically detected MS location. For example, a range may be a zip code, a state, a city or town bounded range, a country, a MAPSCO identifier, or any other reference for accurately identifying a region. Some ranges may be geofenced polygon specifications. Also, a range may be configured to be a targeted region for specifically defining all locations of potential TRODRs for the SPOT, and the targeted region need not be in the proximity of the SPODR at the time of the SPOT. Thus, "range" may be replaced with "targeted region" herein for comprising any specified (e.g. configured) located bounded area, or region in space, at the time of the SPOT.

With reference back to block 212, if it is determined the user did not cause the MS to perform a SPOT, then processing continues to block 226. If block 226 determines the user selected to save the SPOT, then block 228 saves all the information of the data sensed/captured along with the correlated information of blocks 218 through 224. Thereafter, block 230 performs TRODR determination and alert determination for the benefit of one or more TRODRs, and processing continues back to block 202. Block 230 processing is described by FIG. 3. Block 230 processing may occur at the MS of FIG. 2 processing (e.g. the SPOT and correlated data is saved locally) or at the centralized service 30 (e.g. the SPOT and correlated data is saved at the centralized service 30).

With reference back to block 226, if it is determined the user did not select to save the SPOT, then processing continues to block 232. If block 232 determines the user selected to distribute the SPOT, then block 234 distributes the SPOT data accordingly and processing continues to block 230 already described above. Distributing includes sending as/in/with an email, a message, an outbound communication, etc. to one or more recipients or destinations.

With reference back to block 232, if it is determined the user did not select to distribute the SPOT, then processing continues to block 236. If block 236 determines the user selected to manage the SPOT, then block 238 manages the SPOT accordingly and processing continues to block 230 already described above. Managing includes viewing, deleting, modifying, copying, moving, administrating, storing, etc.).

With reference back to block 236, if it is determined the user did not select to manage the SPOT, then processing continues to block 240. If block 240 determines the user selected to process the SPOT in another manner (e.g. share SPOT with others, store SPOT, or other relevant action) for block 230 processing, then block 242 performs the processing of the SPOT accordingly, and processing continues to block 230 already described above.

With reference back to block 240, if it is determined the user did not select to process the SPOT in another manner for block 230 processing, then processing continues to block 244 where any other actions leaving block 202 are appropriately processed before continuing back to block 202.

User interface processing of FIG. 2 may occur in isolated user interfaces provided by the MS of FIG. 2 processing (e.g. in some LBX embodiments), may occur in cooperation to user interface processing provided by the centralized service 30, or may occur in a reasonable combination thereof. In a preferred embodiment, user interface actions are events leaving block 202 with dedicated threads of processing for each event so as to prevent processing from one user interface thread from delaying processing by another user interface thread. This preferred embodiment is to be kept in mind when seeing an otherwise synchronous processing flow shown in FIG. 2.

Depending on the embodiments, processing of blocks 230, 234, 238 and 242 may each occur at the MS of FIG. 2 processing, or at the centralized service 30. In fact, a cloud implementation may cause much or all key processing at the centralized service 30. Those skilled in the art will appreciate various implementations without departing from the spirit and scope of the disclosure for FIG. 2 processing. Moreover, a user interface action is not required for a SPOT as described by FIG. 2. The MS may perform a SPOT on its own, or while mobile, and for a variety of embodiments, applications, or in accordance with qualification criteria or AI carried out by the MS. Also, block 230 processing may occur immediately after processing of block 224, or at other times/actions/events, rather than when the SPOT is saved, distributed, managed, or processed (e.g. shared, stored, etc.)

after being sensed/captured. In other embodiments, only certain user actions on, or for, a SPOT will cause FIG. 3 processing, and in some embodiments a user may configure which actions participate for FIG. 3 processing. In other embodiments, AI is carried out by the MS to determine when to perform FIG. 3 processing, for example anticipating a future event based on data analyzed by the MS.

Figure 3:
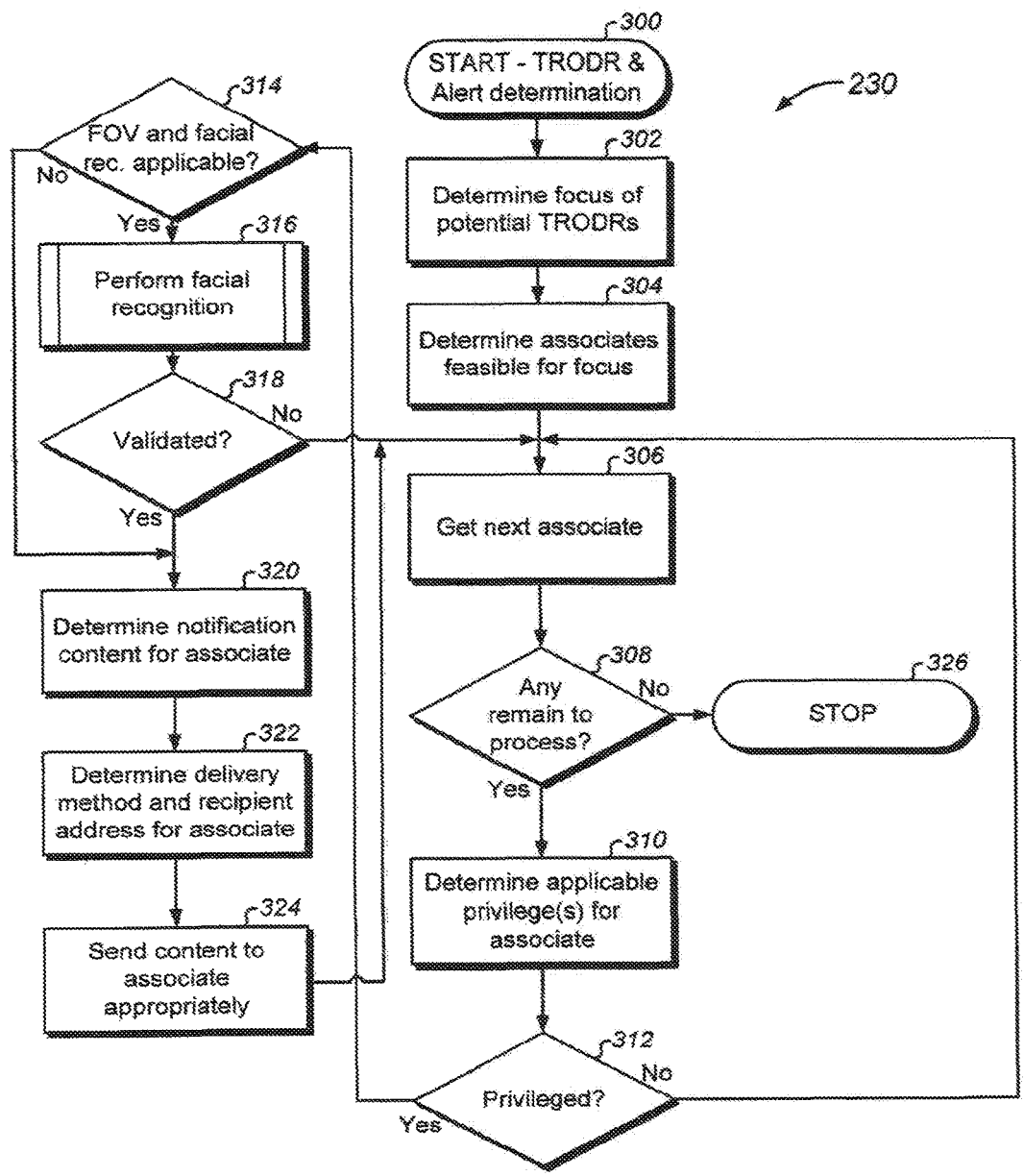
FIG. 3 depicts a flowchart for describing a preferred embodiment of processing for TRODR determination, and processing for notification/alert determination.

FIG. 3 depicts a flowchart for describing a preferred embodiment of processing for TRODR determination, and processing for notification/alert determination, for example as carried out by a MS or a centralized service 30. Block 230 processing begins at block 300 and continues to block 302 for determining the focus for identifying one or more TRODRs potentially affected by, or involved in, the SPOT. If not already completely defined in the focus variables provided, block 302 determines focus as the range, the range constrained by a reasonable distance, or the field of view within a particular range, as discussed herein at the time of the SPOT, and in accordance with any qualification criteria, depending on the type of the SPOT. This finalizes definition of where potential TRODRs are located. Thereafter, block 304 determines all associates (users/TRODRs (i.e. their MS)) of the SPODR which are feasibly physical located in the focus. For example, a centralized service embodiment of processing determines the physical locations of known MSs which are located in the SPODR proximity and focus. In an LBX embodiment, processing queries the Whereabouts Data Record (WDR) queue for the TRODRs physical located in the MS proximity and focus. Block 304 determines a list containing no TRODRs (i.e. empty list), one TRODR, or a plurality of TRODRs which are candidate alert recipients resulting from the SPOT focus. Thereafter, block 306 gets the next (or first at first encounter of block 306 from block 304) MS in the list and continues to block 308. If block 308 determines a MS remains in the list to be processed, processing continues to block 310 for determining associate privileges in place which govern alert processing (see FIG. 5), and block 312 for checking if the MS which was determined to be located in the focus (or range) has the necessary privilege(s) in place. Blocks 310 and 312 may also be involved in evaluating criteria (e.g. qualification criteria) to clarify being privileged under certain conditions (e.g. see qualification criteria optionally configured in FIG. 5).

If block 312 determines the MS is privileged, then processing continues to block 314. If block 314 determines the focus includes a field of view and facial recognition is required, for example from a picture or video taken, then block 316 invokes facial recognition processing on the SPOT using facial recognition criteria and desired facial recognition processing configured by the user (TRODR) as configured at block 506. Thereafter, block 318 determines the facial recognition result. If block 318 determines the facial recognition did indeed validate the TRODR was in the field of view, then processing continues to block 320.

With reference back to block 318, if it is determined the TRODR was not validated with facial recognition criteria specifications configured at block 506, then processing continues back to block 306. With reference back to block 314, if it is determined the focus did not include a field of view or did not require facial recognition as required by the user (TRODR), then processing continues from block 314 to block 320.

Block 320 determines notification content, preferably in accordance with preferences configured by the TRODR at block 506, and processing continues to block 322 where the delivery method preferred by the TRODR is determined (specified at block 506, for example, email, messaging, communicated in a transmitted packet of data, or any other delivery method), and block 324 for sending the notification/alert to the associate (i.e. the TRODR) which FIG. 3 processing determined was located in the focus, had the privilege to be alerted, and met the other required criteria processed (e.g. qualification criteria). Processing leaves block 324 and continues back to block 306.

With reference back to block 312, if it is determined the potential TRODR was not privileged, then processing continues back to block 306. With reference back to block 308, if it is determined all potential TRODRs have been processed in the list from block 304, then FIG. 3 processing terminates at block 326.

Note that facial recognition is not required, but may be a useful user configuration to require it for being qualified and validated as a TRODR in a field of view. Simply being physically located in the field of view is enough to be a potential TRODR, for example in a photographic frame of a video SPOT wherein the user's face is not perceptible or not facing the MS performing the SPOT.

Blocks 310/312 may involve a complex determination for whether or not a potential TRODR is privileged when evaluating qualification criteria to clarify being privileged. For example, block 506 supports specifications of qualification criteria, and the qualification criteria may be specified at blocks 518 and 522.

Figure 4:
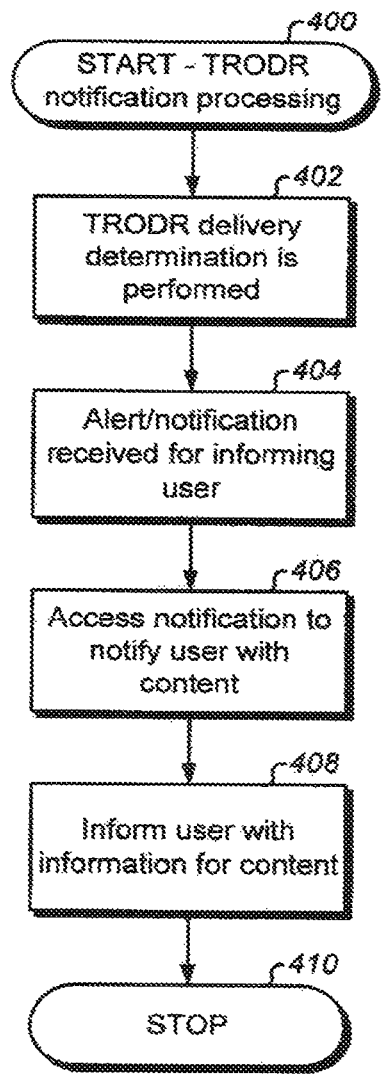
FIG. 4 depicts a flowchart for describing a preferred embodiment of TRODR notification/alert processing.

FIG. 4 depicts a flowchart for describing a preferred embodiment of TRODR notification/alert processing after an alert has been determined for delivery. Processing begins at block 400 and continues to block 402 where TRODR delivery determination is performed. In one embodiment, block 402 processing occurs at the centralized service 30, and in another embodiment block 402 processing occurs at the MS. Thereafter, block 404 completes receiving the notification/alert, block 406 accesses the notification/alert for content to inform the user with, block 408 informs the user through an informative user interface with information for the content, and block 410 terminates processing. There are many embodiments for how the notification/alert is communicated to the TRODR of FIG. 4 processing. In some embodiments, permissions or privileges, as well as qualification criteria, may be accessed and enforced at block 402 to determine if subsequent blocks are to be performed. For example, block 402 may determine that a necessary privilege or condition is not in place, and processing will immediately terminate thereafter at block 410. For example, LBX permissions may be enforced at block 402, either at the sending MS, the receiving MS, or both.

There are many embodiments for data that may be contained in the content of the notification, for example so as to inform the recipient user without question what was the SPOT, including:

Detailed content describing the SPOT, and perhaps the entire SPOT data itself, and perhaps any subset of data collected by FIG. 2 for the SPOT;

Detailed content describing FIG. 3 processing which was used to determine confirmation of the delivery, for example qualification criteria, privilege(s) used, associate group(s) configured for alerting, range information, focus information, or field of view information etc.;

Date/time information associated with the SPOT;

Other associates/TRODRs affected by, or involved in, the SPOT (e.g. identifiers);

FIG. 5 configuration information used to confirm alert delivery for the SPOT;

Information determined in real-time, or as configured by user at block 506;

Aim information for defining the field of view when determining TRODRs;

The event which caused the SPOT;

The event which caused the alert;

User information for the SPODR or other TRODRs, for example as maintained in centralized service 30 as part of a user account or a registration required to the centralized service 30; and/or Any subset(s) or combinations thereof.

FIG. 5 depicts a flowchart for describing a preferred embodiment of MS interoperability configuration processing invoked by MS users. FIG. 5 user interface processing may be hosted by a centralized service 30 for configurations between users, hosted at a MS for locally maintaining configurations and/or communicating to other MSs as needed, or some reasonable combination thereof. Interoperability configuration processing begins at block 500 and continues to block 502 where the user interfaces with the system until a user action of interest to the present disclosure is performed by the user, in which case processing continues to block 504.

If block 504 determines the user selected to configure for himself delivery processing with respect to SPODR and TRODR processing, then block 506 interfaces with the user for delivery specification information, for example the information used at blocks 302, 320, 322, 314, 316, and perhaps qualification criteria defined above for the purpose of additional processing by blocks 310/312 for applying conditions to further qualify the privilege verification for continuing from block 312 to block 314. Qualification criteria associated with the SPOT may be compared to qualification criteria defined at block 506 for further determination of whether or not to perform the alert. Facial recognition criteria, if used, may be configured at block 506 (e.g. one or more facial graphical images for scaled, panned and estimated feature comparison to pictures or video frames (i.e. photographic frames)). Similarly, a user's unique voice criteria may be provided or trained by a user, at block 506, for determination of a TRODR being within sound range of a SPODR. Block 506 permits the user to override defaulted content used at block 320 with customized content statically defined, or dynamically built using user specified resolvable variables in real time. Block 506 permits the user to specify a preferred method of notification/alert delivery (block 322), and perhaps a priority order of multiple methods thereof, for ensuring delivery of the alert in case of delivery attempt failure(s), and perhaps with a forced user acknowledgement that the notification was seen or heard. Recipient addresses, phone numbers, or delivery target information is also specified, and perhaps with attributes associated with the content for appearance, highlight, format, or any other reasonable qualifier for the content. Block 506 permits specifying whether to enforce using facial recognition at all at block 314, and perhaps a certain set of algorithms for performing the facial recognition. Alternatively, wherever facial recognition is discussed, a certain type of automated recognition may be used which does not use a face. For example, the user may configure automated recognition criteria at block 506 which can be used at block 316 for validating TRODR presence, such as a color, article worn by the user, or some interpretable data comparable for matching in the field of view (e.g. text on a short by worn by user). In the case of voice match, determination is made at blocks 310 and 312, as is a variety of other complex determinations of one or more conditions to consider in addition to being privileged as configured by FIG. 5. Similarly, a user may specify at block 506 one or more voice map algorithms for use at blocks 310/312. After the user specifies delivery specification criteria at block 506, processing continues to block 508 where the specifications are saved, and then back to block 502.

With reference back to block 504, if it is determined the user did not select to configure for himself delivery processing with respect to SPODR and TRODR processing, then processing continues to block 510. If block 510 determines the user selected to configure interoperability processing, then block 512 presents options to the user, and block 514 waits for a user action. When a user action of interest is determined, processing leaves block 514 and continues to block 516.

If block 516 determines the user selected to configure SPODR willingness, then block 518 interfaces with the user for specification(s) to the user's extent of willingness to be a SPODR for others. Block 518 supports user specifications for defining the SPOT types for participation (all, none, or some subset), whether willing to be a SPODR for every known associate, specific group(s) of associates, specific associates, or in accordance with particular qualification criteria to be resolved at the time of the SPOT. Thus, block 518 determines permission/privileges and constraints/criteria for whether or not SPODR processing occurs for one or more potential TRODRs defined at block 518. Block 518 saves configuration information before continuing back to block 512.

With reference back to block 516, if it is determined the user did not select to configure SPODR willingness, then processing continues to block 520. If block 520 determines the user selected to configure TRODR interest, then block 522 interfaces with the user for specification(s) of the user's desire to be a TRODR for particular SPODRs. Block 522 supports user specifications for defining the SPOT types for participation (all, none, or some subset), whether willing to be a TRODR for every known associate, specific group(s) of associates, specific associates, or in accordance with particular qualification criteria to be resolved at the time of the SPOT. Thus, block 522 determines permission/privileges and constraints/criteria for whether or not TRODR processing occurs for one or more SPODRs defined at block 522. Block 522 saves configuration information before continuing back to block 512.

With reference back to block 520, if it is determined the user did not select to configure TRODR interest, then processing continues to block 524. If block 524 determines the user selected to exit interoperability configuration processing, then processing continues back to block 502, otherwise processing continues to block 526 where any other actions leaving block 514 are appropriately processed before continuing back to block 512.

With reference back to block 510, if it is determined the user did not select to configure interoperability, then processing continues to block 528. If block 528 determines the user selected to configure associate group information (e.g. which may be used in configurations at block 518 and block 522), then block 530 presents group management options to the user, and block 532 waits for a user action. When a user action of interest is determined, processing leaves block 532 and continues to block 534.

If block 534 determines the user selected to add a new group, then block 536 interfaces with the user for specification(s) of the new group (name and members (i.e. associates)). Associates can be added by user name, device identifier, an address, or any unique handle for the associate, as applicable to an embodiment for enabling proper MS identification. After specification of the new group, the group information is saved and processing continues back to block 530.

With reference back to block 534, if it is determined the user did not select to add a new group, then processing continues to block 538. If block 538 determines the user selected to delete a group, then block 540 interfaces with the user for specification(s) of the group(s) to delete. When the group is deleted, all references to member associates of the group are also deleted. In some embodiments, warnings may be provided to the user that existing block 518 and 522 configurations will be affected. After specification of the group to delete, the group is deleted and processing continues back to block 530.

With reference back to block 538, if it is determined the user did not select to delete a group, then processing continues to block 542. If block 542 determines the user selected to modify a group, then block 544 interfaces with the user for specification(s) for altering group information such as the group name which can be referenced at blocks 518 and 522, as well as member associates of the group, for example to add associate(s), or remove associate(s) from the group (e.g. by identifier/handle discussed above for block 536). After the group is modified to the user's satisfaction, the information is saved and processing continues back to block 530.

With reference back to block 542, if it is determined the user did not select to modify a group, then processing continues to block 546. If block 546 determines the user selected to exit group management processing, then processing continues back to block 502, otherwise processing continues to block 548 where any other actions leaving block 532 are appropriately processed before continuing back to block 530.

In some embodiments, SPODR/TRODR interoperability configuration (blocks 512 through 526) is separated from group management configuration (blocks 530 through 548) from a single user interface perspective. In some embodiments, authentication may be provided to FIG. 5 thereby exposing options that make sense for the particular security level of the user. In some embodiments, a user cannot remove groups that are already configured for use by blocks 518 and 522.

With reference back to block 528, if it is determined the user did not select to configure group information, then processing continues to block 550 where any other actions leaving block 502 are appropriately processed before continuing to block 502.

User interface processing of FIG. 5 processing may occur in isolated user interfaces provided by the MS of FIG. 5 processing (e.g. in some LBX embodiments), may occur in cooperation to user interface processing provided by the centralized service 30, or may occur in a reasonable combination thereof. FIG. 5 processing may involve any data processing system with access to a centralized service 30 embodiment for user interoperability configuration. In a preferred embodiment, user interface actions are events leaving blocks 502, 514 and 532 with dedicated threads of processing for each event so as to prevent processing from one user interface thread from delaying processing by another user interface thread. This preferred embodiment is to be kept in mind when seeing an otherwise synchronous processing flow shown in FIG. 5.

Depending on the embodiments, FIG. 5 block processing may each occur at the MS, or at the centralized service 30, and saved data may be saved at an MS and/or at the centralized service 30. In fact, a cloud implementation may cause much or all key processing and/or storage at the centralized service 30. Those skilled in the art will appreciate various implementations without departing from the spirit and scope of the disclosure for FIG. 5 processing.

Sensing a SPOT may be performed for presence of data, or lack of a detected presence of data, when doing the SPOT. Also, when a TRODR is within range (i.e. focus, field of view) at the time of the SPOT, there are a variety of embodiments when the TRODR is alerted while not within focus at the time of the alert, for example a later time when the SPOT is acted upon in some way, when AI determines an alert should be delivered, or when qualification criteria is determined to be satisfied at a particular time after the SPOT occurred and TRODR(s) was determined. For example, an action for delivering a copy of the SPOT, weeks after the SPOT, may cause an alert to the TRODR where the TRODR is certainly no longer within range.

Data saved or stored at processing blocks described above may be multi-part fields (i.e. have sub-fields), fixed length records, varying length records, or a combination with field(s) in one form or the other. Some data embodiments will use anticipated fixed length record positions for sub-fields that can contain useful data, or a null value (e.g. −1). Other data embodiments may use varying length fields depending on the number of sub-fields to be populated. Other data embodiments will use varying length fields and/or sub-fields which have tags indicating their presence. Other data embodiments will define additional fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments). Of course, SQL data embodiments may be used to provide convenient methods for storing and accessing data.

Figure 6:
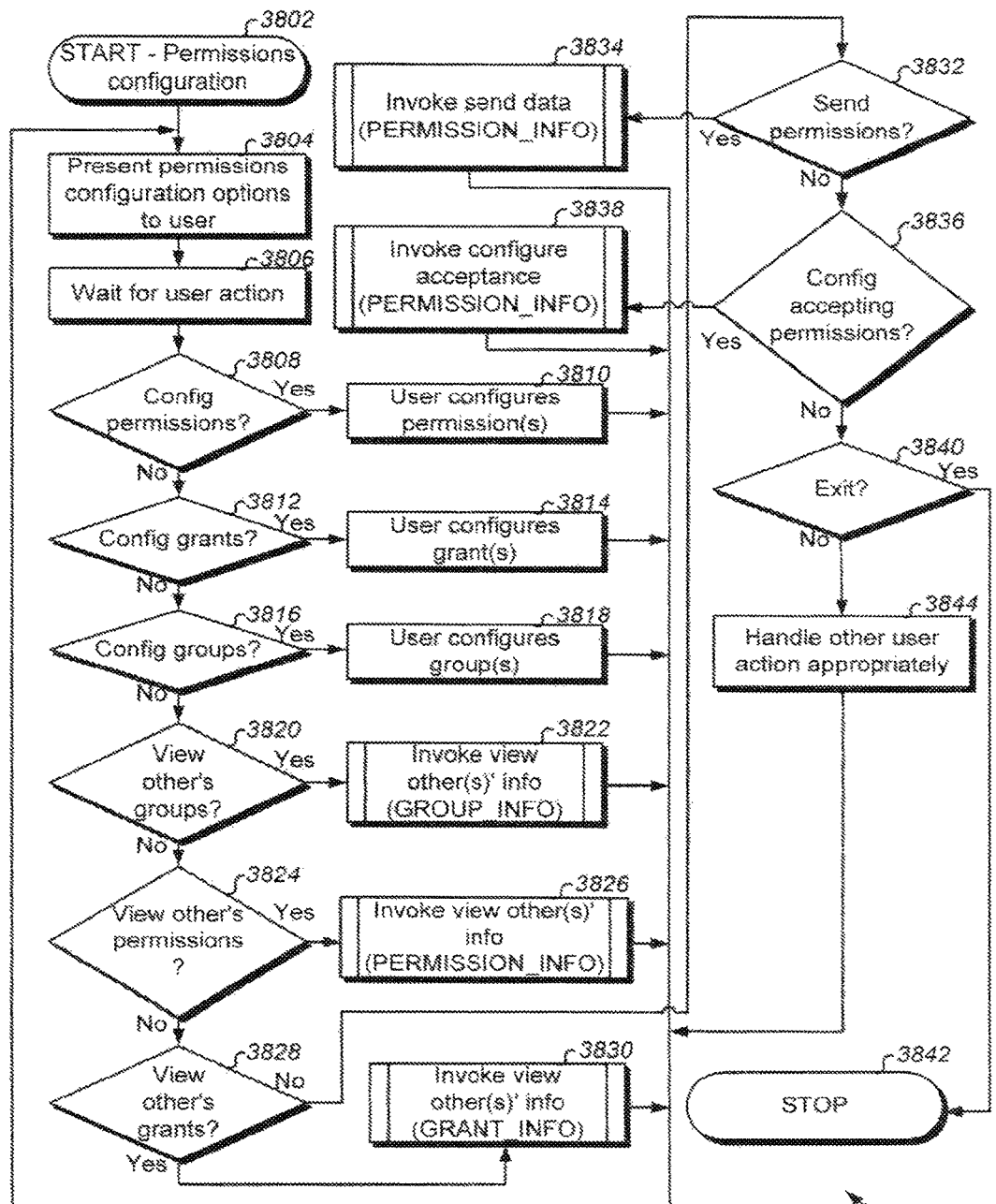
FIG. 6 depicts a flowchart for describing a preferred embodiment of permission/privilege and group configuration processing.

FIG. 6 depicts a flowchart for describing a preferred embodiment of permission/privilege and group configuration processing, as well as how data is shared between MSs, in an LBX embodiment (see Ser. No. 12/590,831 filed Nov. 13, 2009 and entitled "System and Method for Location Based Exchanges of Data Facilitating Distributed Locational Applications).

Figure 7A:
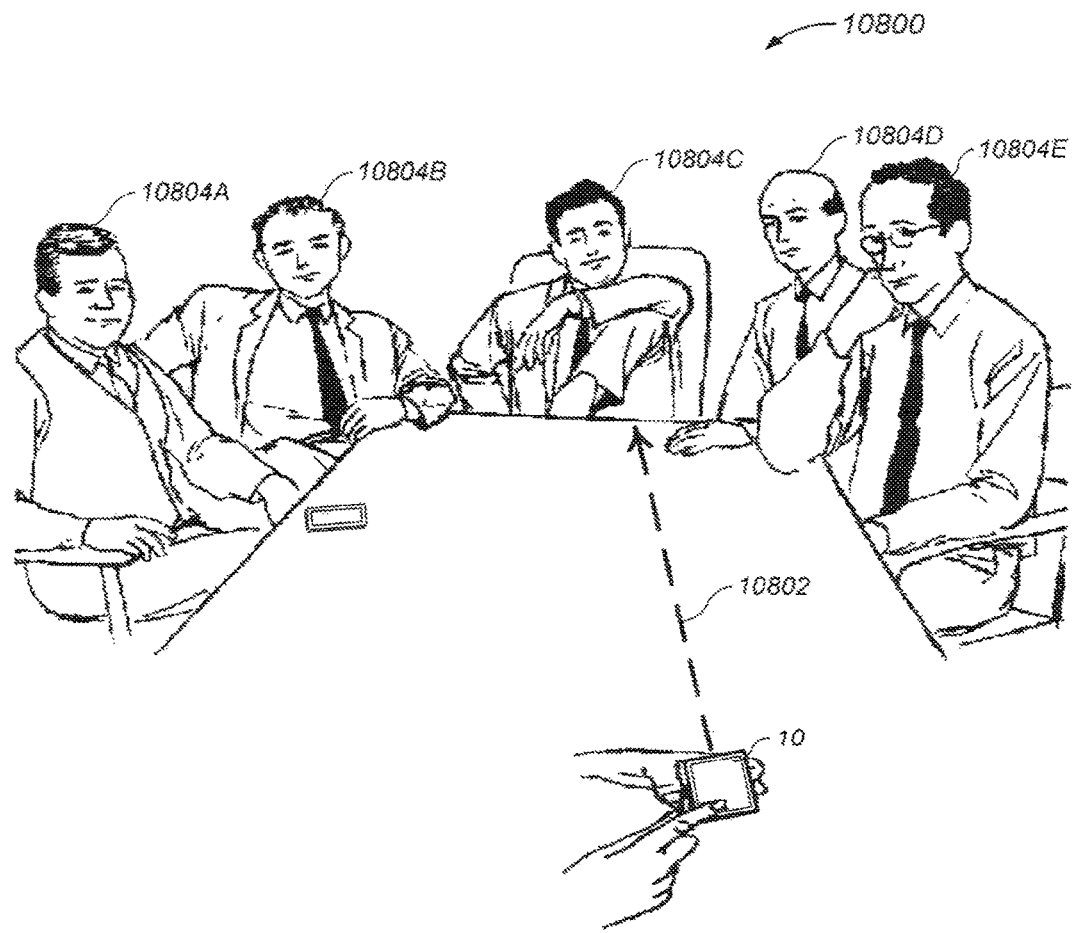
FIG. 7A depicts an illustration describing one preferred embodiment of aiming a MS at another MS and shooting the MS with data, in accordance with Ser. No. 12/807,806 entitled "System and Method for Targeting Data Processing System(s) With Data"

FIG. 7A depicts an illustration describing one preferred embodiment of aiming a MS at another MS and shooting the MS with data, in accordance with Ser. No. 12/807,806 entitled "System and Method for Targeting Data Processing System(s) With Data". This shooting action is also a SPOT by the shooting MS and a VV is implemented. This demonstrates an example where a field of view is not necessarily visual, but can in fact be specified with a shooter target size, intended plurality of recipients of a shot, or as described in Ser. No. 12/807,806.

Figure 7B:
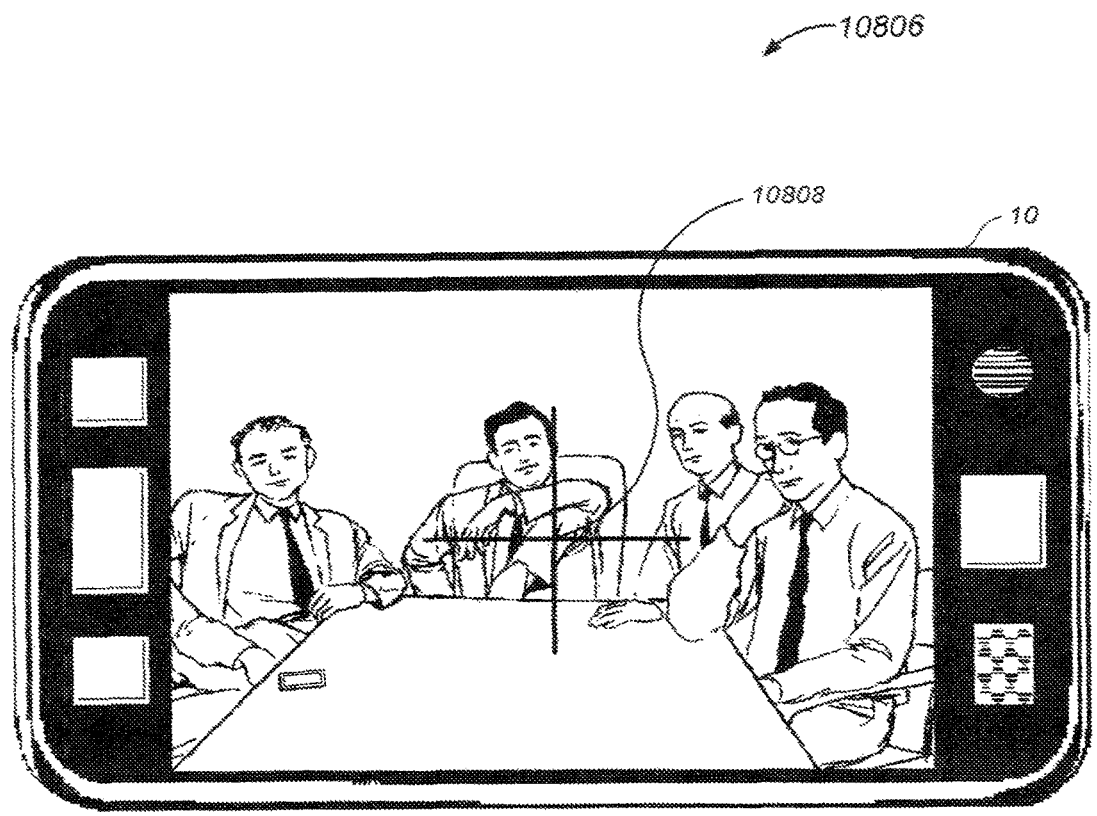
FIG. 7B depicts an illustration describing one preferred embodiment of aiming a MS at another MS and shooting the MS with data (i.e. Ser. No. 12/807,806 entitled "System and Method for Targeting Data Processing System(s) With Data")

FIG. 7B depicts an illustration describing one preferred embodiment of aiming a MS at another MS and shooting the MS with data, in accordance with Ser. No. 12/807,806 entitled "System and Method for Targeting Data Processing System(s) With Data". Also, FIG. 7B depicts an illustration describing one preferred embodiment of taking a photo or video using a MS wherein there is a field of view that is truly visual. It is possible that TRODRs in the background are also captured (although not shown). A VV is again implemented as described in Ser. No. 12/807,806.

Figure 7C:
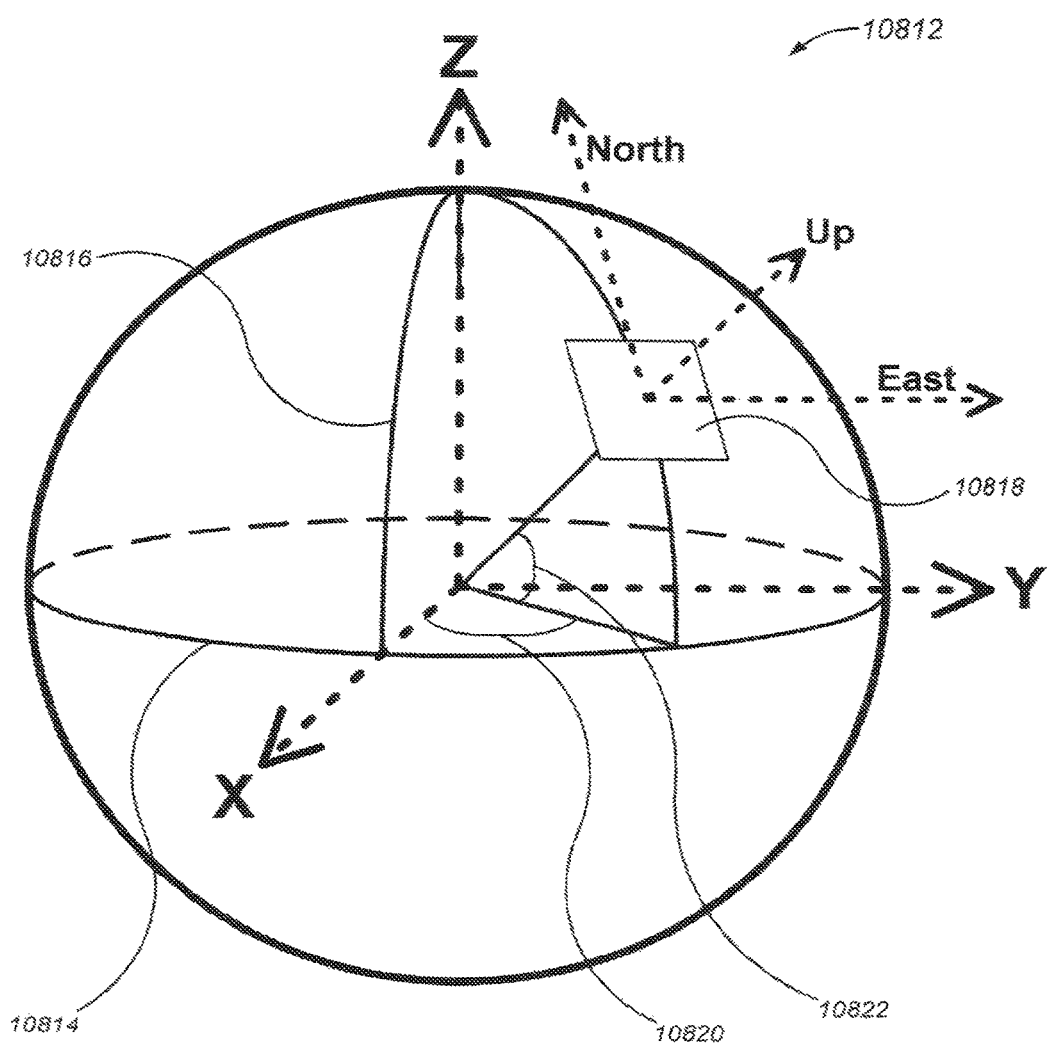
FIG. 7C depicts an illustration for discussing and describing preferred embodiments for mathematical models used in carrying out shoot or aim processing.

FIG. 7C depicts an illustration for discussing and describing preferred embodiments for mathematical models used in carrying out shoot or visual aim processing to establish the focus described above. A globally referenced coordinate system 10812 is preferred for a starting point, but there are many different mathematical models that can be deployed depending on model errors, VV distances for particular applications, MS capabilities, implementation preferences, and other considerations. A preferable earth model uses latitude 10822 (angle between the equatorial plane 10814 and a line that runs from the reference ellipsoid center to surface, for example to the center of plane 10818), and longitude 10820 (angle east or west of prime meridian reference 10816 between the two poles to another meridian that passes through a point, for example to the center of plane 10818) for a reference ellipsoid to approximate shape to account for flattening of the poles and bulging of the equator. Plane 10818 is theoretically tangent to the earth surface at a single point and perpendicular (perhaps with ellipsoid adjustment) to the line running from its center point to the center of the earth. Altitude or elevation may be measured from the center of plane 10818 to the center of a translated parallel plane in the "Up" direction as shown (i.e. further away from the earth's center), perhaps using sea level as the reference. Latitude, longitude and elevation (or altitude) are well known to those skilled in the art. Survey grade systems are capable to 1 cm accuracy, however a selected planar local coordinate system at plane 10818 may be more practical for optimal accuracy, in particular for short distance vectors which do not need to account for earth curvature or terrain. Latitude, longitude and elevation provide at least good starting reference point coordinates for relative finer measurements. Other positioning models may be used for simplification such as an overall Cartesian coordinate system (represented by large X, Y, Z axis) or polar coordinate system. A planar coordinate system at plane 10818 may also use a Cartesian coordinate system (represented by North, East, Up axis) or polar coordinate system.

Figure 7D:
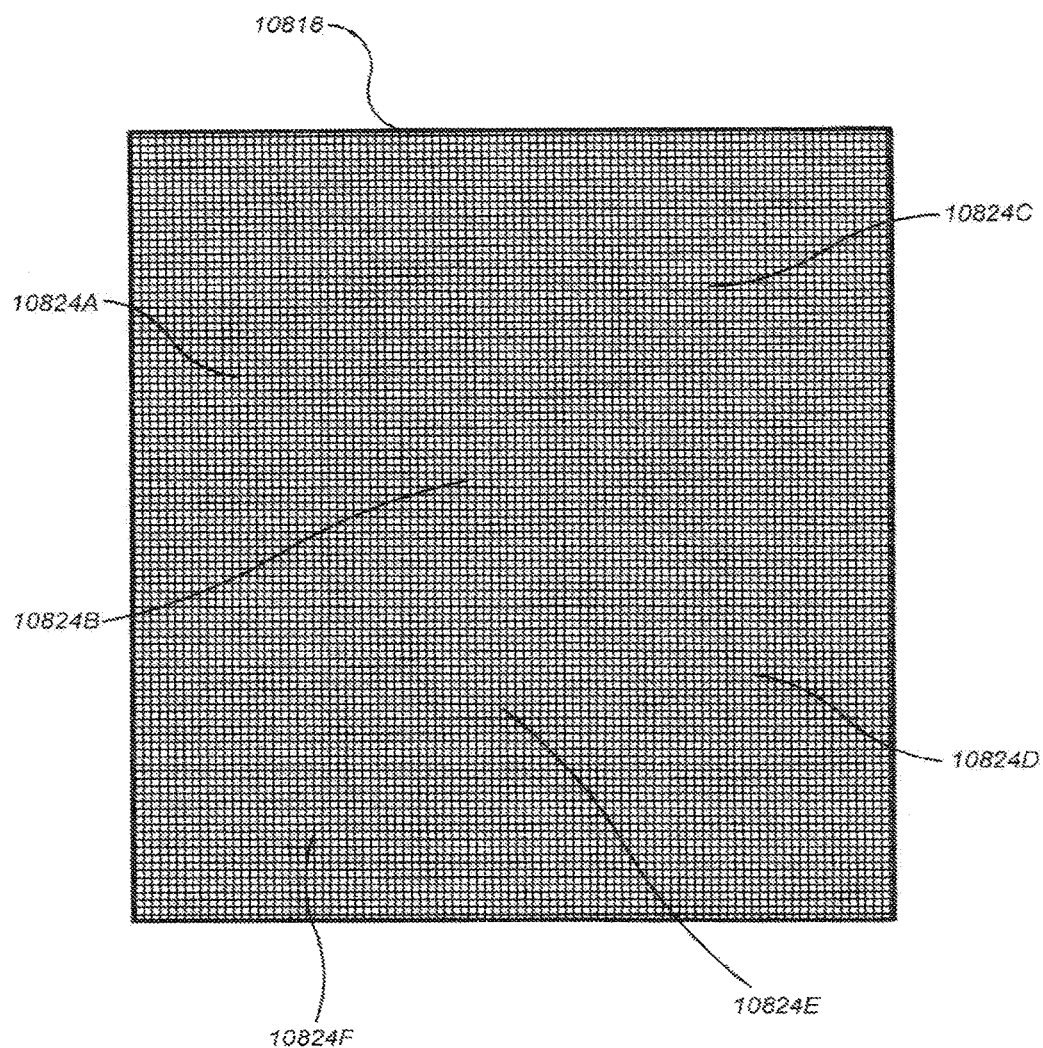
FIG. 7D depicts an illustration for describing a preferred localized coordinate system used to carry out shoot or aim processing.
Figure 7E:
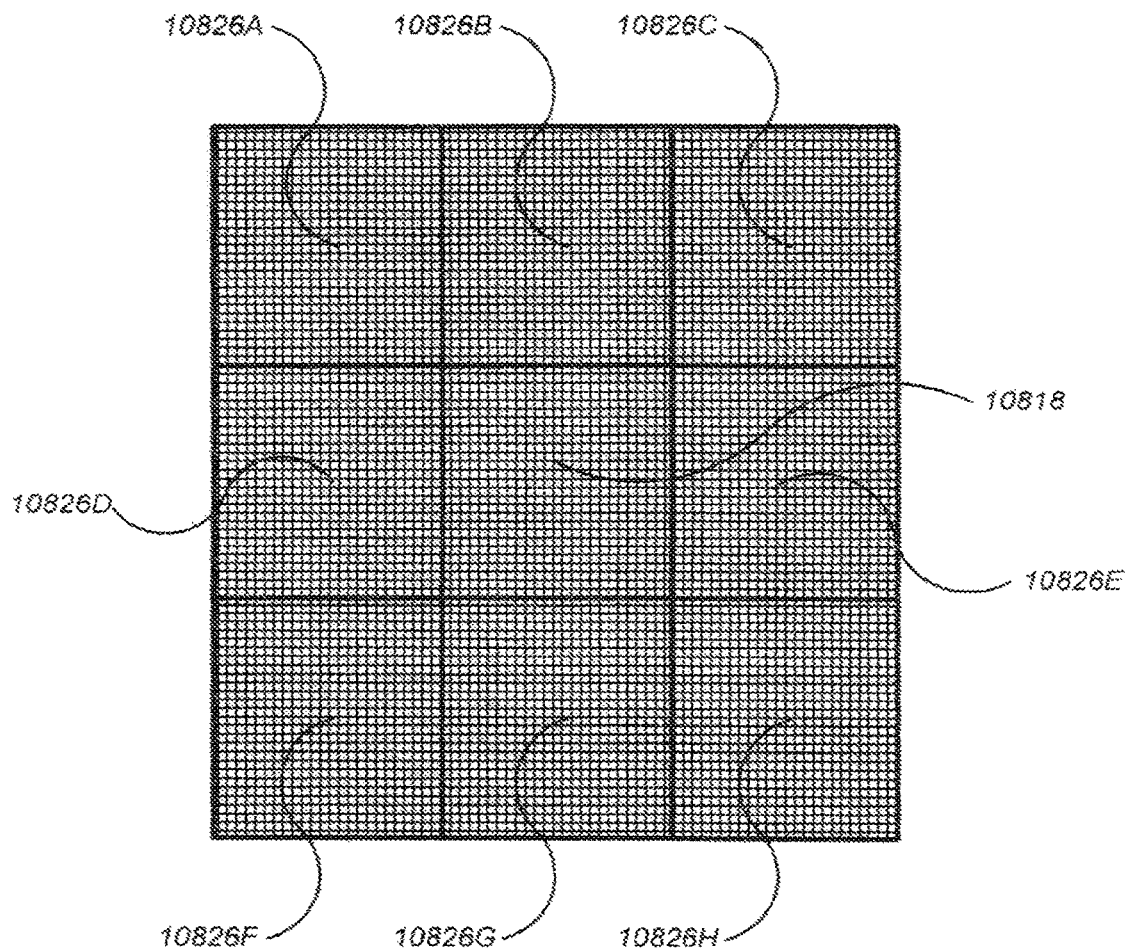
FIG. 7E depicts an illustration for further describing a preferred localized coordinate system used to carry out shoot or aim processing.
Figure 7F:
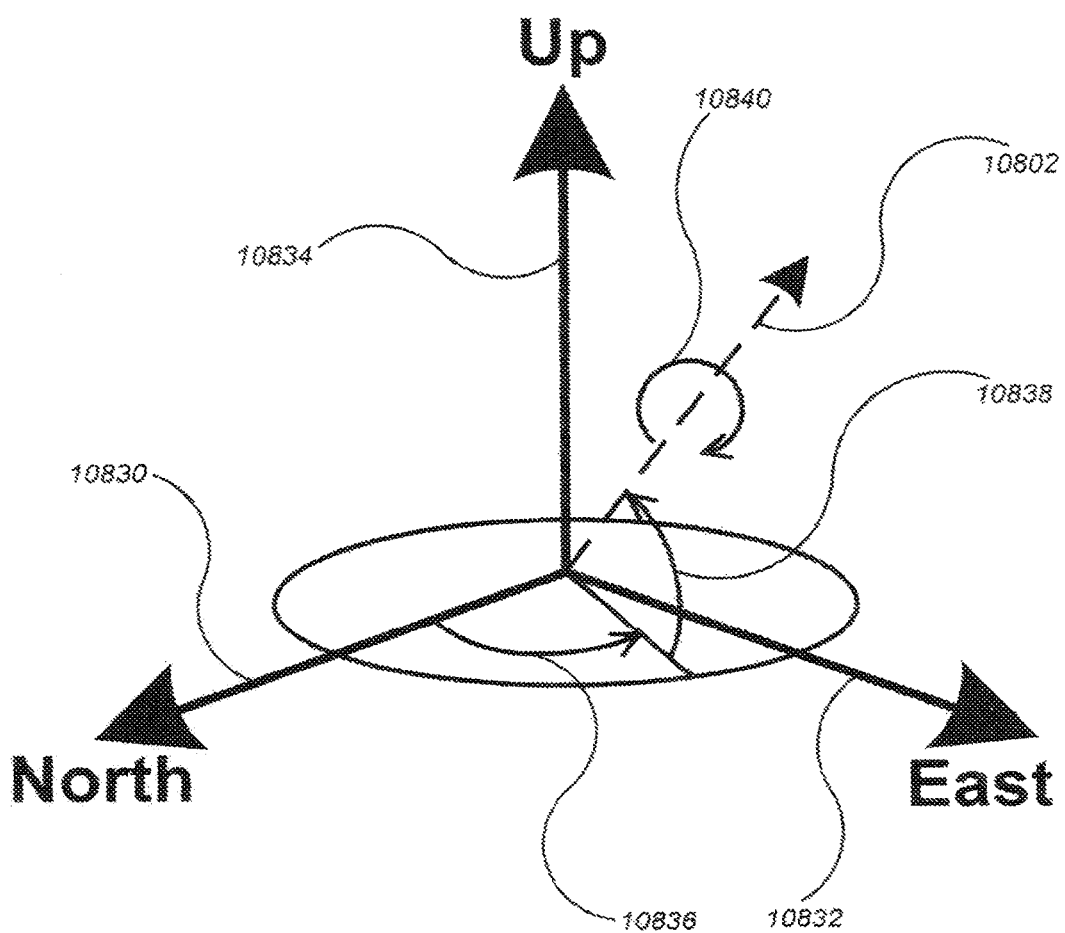
FIG. 7F depicts an illustration for further describing a preferred localized to coordinate system used to carry out shoot or aim processing.

Mathematical models exemplified by FIG. 7C facilitate determination of the focus described above in embodiments where a field of view is applicable. FIGS. 7D through 7F further provide remarkable model improvements for higher level of accuracies of the focus.

FIG. 7D depicts an illustration for describing a preferred localized coordinate system used to carry out shoot or aim processing. In one preferred embodiment, plane 10818 is a two dimensional plane with fine Cartesian coordinate system measurements (X and Y axis) wherein one axis points to North and the other points to East with a particular point at the origin. In another preferred embodiment, plane 10818 is a North and East plane of a three dimensional fine Cartesian coordinate system (X, Y and Z axis) wherein the additional axis points "Up" for altitude (or elevation). A two dimensional or three dimensional polar coordinate system may be used. Plane 10818 includes one or more known location points which map directly to a point described by a latitude and longitude (and elevation in 3D embodiment). Point(s) 10824 of the plane (10824A through 10824F) are precise globally referenced coordinate system points that correspond with precise reference points of the coordinate system in use by plane 10818. This facilitates precise calculations where earth curvature and imperfections are not to be considered (e.g. reasonably short VV 10802 distances (e.g. 1 meter to hundreds of meters)) while enabling reasonable representations in world coordinates. Plane 10818 is preferably distinct for a particular date/time stamp to ensure point(s) 10824 are as accurate as possible at the time of use. Plane 10818 is much like the State Plane Coordinate System (SPS or SPCS) which is a set of 124 geographic zones or coordinate systems designed for specific regions of the United States so that a simple and highly accurate Cartesian coordinate system is used rather than a more complex ellipsoid coordinate system.

Point(s) 10824 provide geodetic datum for reference from which measurements are made. In surveying and geodesy, a datum is a set of reference points on the Earth's surface against which position measurements are made. There are hundreds of locally-developed reference datums around the world, usually referenced to some convenient local reference points. Converting between geodetic coordinates and Cartesian coordinates, as well as from Cartesian coordinates to geodetic coordinates, is well known by those skilled in the art. There are many techniques, including those described in:

"Methods to convert local sampling coordinates into geographic information system/global positioning systems (GIS/GPS)-compatible coordinate systems" by Mark Rudnicki and Thomas H. Meyer (Department of Natural Resources and the Environment, 2007);

"GRID, GROUND, AND GLOBE: DISTANCES IN THE GPS ERA" by Thomas H. Meyer;

U.S. Pat. No. 7,647,199 ("Method for determining positions of points to be measured", Green et al);

U.S. Pat. No. 5,774,826 ("Optimization of survey coordinate transformations", McBride);

U.S. Pat. No. 5,233,357 ("Surveying system including an electro-optic total station and a portable receiving apparatus comprising a satellite position-measuring system", Ingensand et al.); and U.S. Pat. No. 4,791,572 ("Method for accurately displaying positional information on a map", Green et al).

Planets other than earth can use similar models as described above, and places in ambiguous space can use a manufactured globally referenced coordinate system provided MSs involved share, or can transform, the model, for example a space station referenced coordinate system.

FIG. 7E depicts an illustration for further describing a preferred localized coordinate system used to carry out shoot or visual aim processing. A Cartesian coordinate system plane 10818 may be geographically surrounded by other reference coordinate system planes 10826 (i.e. 10826A through 10826H). In some embodiments, planes 10826 have common datum points 10824 so that the same coordinate system measurements can be used consistently. In other embodiments, each surrounding planes 10826 have associated transformation matrices for transforming points from their native coordinate system to the coordinate system of plane 10818 and/or visa-versa. As well known to those skilled in the art, a transformation matrix enables mathematical translation, rotation and scaling between different coordinate systems for accurate measurements between systems. There should be eight adjacent coordinate system planes 10826 which are preferably associated by date/time to plane 10808 also selected by date/time for use. It will be a rare occurrence for one MS to shoot another MS in a different Cartesian coordinate system, but the present disclosure handles this situation properly. FIG. 7E depicts a two dimensional Cartesian coordinate system model, but three dimensional models also have analogous transformation of points between different three dimensional models for accurate measurement results.

FIG. 7F depicts an illustration for further describing a preferred localized coordinate system used to carry out shoot or visual aim processing as it relates to the focus (e.g. field of view) described above. A Cartesian coordinate system from FIG. 7F is shown for plane 10818 wherein North may be Y axis 10830, East is preferably X axis 10832 and Up is preferably Z axis 10834. When a three dimensional model is used, the starting point for VV 10802 is mathematically translated to be placed at the origin. At time of shooting, or aiming a picture or video, MS yaw 10836 is a measured angle on the X/Y plane relative North (heading is typically measured clockwise from North, but FIG. 108G shows a negative angle which can be used to determine the positive angle by subtraction from 360 degrees), MS pitch 10838 is a measured angle in the Z (Up) direction from the x/y plane (perpendicular to X/Y plane up to the VV 10802), and MS roll is a measured angle of turning/rolling the MS from side to side as through the VV were an axle through the line of aim of the MS which can be rolled around. Preferably, MS roll is not used in calculations because the aimed vector does not change with different roll values. In a two dimensional model, MS pitch is not needed. The present disclosure is not to be limited to a particular mathematical model. There are many different models that may be used. Angles 10836 and 10838 are easily determined (e.g. using polar coordinates) given the starting point (e.g. origin) coordinates, end point coordinates and distance between the starting point and end point.

Statistics are preferably maintained for processing at blocks 208, 212, 218, 220, 222, 224, 228, 230, 234, 238, 242, 302, 304, 310, 312, 314, 316, 318, 320, 322, 324, 404, 408, 506/508, 518, 522, 536, 540, 544, and any other block processing heretofore described. Statistics can be maintained by the particular MS, at centralized service 30, or at both places as needed and depending on the embodiment. In fact, a cloud implementation may cause much or all of the key statistics to be maintained at the centralized service 30. Those skilled in the art will appreciate various implementations without departing from the spirit and scope of the disclosure.

Company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method in a multi-user centralized service data processing system, comprising:
    storing an alert delivery configuration for delivery of an alert to a first user that is feasibly physically located in a proximity range of a second user at a time associated with a recording data processing system detecting a health vital sign condition of the second user;
    storing an interoperability configuration enabling the alert to the first user that is feasibly physically located in the proximity range of the second user at the time associated with the recording data processing system detecting the health vital sign condition of the second user;
    receiving communications of the recording data processing system detecting the health vital sign condition of the second user, and determining the proximity range with a physical location of the recording data processing system at the time associated with the recording data processing system detecting the health vital sign condition of the second user;
    receiving by radio wave transmission a physical location of a first data processing system associated with the first user, and determining with the physical location of the first data processing system and the proximity range that the first data processing system is physically located in the proximity range of the recording data processing system at the time associated with the recording data processing system detecting the health vital sign condition of the second user;
    determining with the interoperability configuration the first user is privileged for receipt of the alert to the first user that is feasibly physically located in the proximity range of the second user at the time associated with the recording data processing system detecting the health vital sign condition of the second user; and
    communicating the alert in accordance with the alert delivery configuration.

2. The method of claim 1 wherein the centralized service data processing system receives a plurality of health monitor measurements associated with the second user.

3. The method of claim 2 wherein the plurality of health monitor measurements is compared to qualification criteria for data that is absent in the plurality of heath monitor measurements.

4. The method of claim 1 wherein the vital sign condition is a subset of situational proximity observation data.

5. The method of claim 1 wherein the centralized service data processing system receives by the radio wave transmission the physical location of the recording data processing system.

6. The method of claim 1 wherein the centralized service data processing system receives sound data associated with the second user.

7. The method of claim 1 wherein the centralized service data processing system receives one or more photographic frames associated with the second user.

8. The method of claim 1 wherein an action by the second user triggers sending the vital sign condition to the centralized service data processing system.

9. The method of claim 1 wherein the first user and the second user are associates configured in social relationship data.

10. The method of claim 1 wherein the centralized service data processing system maintains data including at least one of:
    physical locations of mobile data processing systems,
    a location of a mobile data processing system carried by a specific person,
    time data of the mobile data processing systems,
    a time of the mobile data processing system carried by the specific person,
    a first user configuration associating the mobile data processing system with the specific person,
    a second user configuration associating the recording data processing system with the specific person,
    a third user configuration associating user identifiers,
    a fourth user configuration associating device identifiers, or
    a user configured privilege.

11. The method of claim 1 wherein the vital sign condition is recorded with or without the second user intentionally recording.

12. The method of claim 1 wherein qualification criteria is configured to be compared to the vital sign condition at the centralized service data processing system or at the recording data processing system.

13. The method of claim 1 wherein the centralized service data processing system receives data associated with the second user, the data associated with the second user including at least one of:

force data,
gravity data,
posture data,
inertial measurement data,
accelerometer data,
compass data,
gyroscope data,
speed data,
distance data,
heading data,
motion data,
movement data,
pressure data,
atmospheric pressure data,
fluid pressure data,
time data,
elevation data,
altitude data,
depth data,
manometer data,
barometer data,
diaphragm data,
transducer data,
ion data,
differential measurement data,
electron data, or
magnetic data.

14. The method of claim 1 wherein the centralized service data processing system receives data associated with the second user, the data associated with the second user including at least one of:
sphygmometer data,
health monitor data,
heart rate data,
rhythm data,
sampled data,
artificial intelligence determined data,
sensed data, or
data determined associated with the second user.

15. The method of claim 1 wherein the centralized service data processing system receives data associated with the second user, the data associated with the second user including at least one of:
atomic data,
molecular data,
atmospheric data,
environmental data,
radiation data,
smoke data,
data for particular gasses,
germ data, or
temperature data.

16. A multi-user centralized service data processing system, comprising:
one or more processors; and
memory coupled to the one or more processors and storing instructions, wherein the one or more processors, based on the instructions, perform operations comprising:
storing an alert delivery configuration for delivery of an alert to a first user that is feasibly physically located in a proximity range of a second user at a time associated with a recording data processing system detecting a health vital sign condition of the second user;
storing an interoperability configuration enabling the alert to the first user that is feasibly physically located in the proximity range of the second user at the time associated with the recording data processing system detecting the health vital sign condition of the second user;
receiving communications of the recording data processing system detecting the health vital sign condition of the second user, and determining the proximity range with a physical location of the recording data processing system at the time associated with the recording data processing system detecting the health vital sign condition of the second user;
receiving by radio wave transmission a physical location of a first data processing system associated with the first user, and determining with the physical location of the first data processing system and the proximity range that the first data processing system is physically located in the proximity range of the recording data processing system at the time associated with the recording data processing system detecting the health vital sign condition of the second user;
determining with the interoperability configuration the first user is privileged for receipt of the alert to the first user that is feasibly physically located in the proximity range of the second user at the time associated with the recording data processing system detecting the health vital sign condition of the second user; and
communicating the alert in accordance with the alert delivery configuration.

17. The centralized service data processing system of claim 16 wherein the centralized service data processing system receives sound data associated with the second user.

18. The centralized service data processing system of claim 16 wherein the centralized service data processing system receives one or more photographic frames associated with the second user.

19. The centralized service data processing system of claim 16 wherein an action by the second user triggers sending the vital sign condition to the centralized service data processing system.

20. The centralized service data processing system of claim 16 wherein the centralized service data processing system receives data associated with the second user, the data associated with the second user including at least one of:
atomic data,
molecular data,
atmospheric data,
environmental data,
radiation data,
smoke data,
data for particular gasses,
germ data, or
temperature data.

* * * * *